(12) United States Patent
Horn et al.

(10) Patent No.: US 11,870,622 B2
(45) Date of Patent: Jan. 9, 2024

(54) SELECTING A TRANSMISSION CONFIGURATION

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/332,052

(22) Filed: May 27, 2021

(65) Prior Publication Data

US 2021/0392021 A1 Dec. 16, 2021

Related U.S. Application Data

(60) Provisional application No. 63/037,530, filed on Jun. 10, 2020.

(51) Int. Cl.
*H04L 27/20* (2006.01)
*H04L 5/00* (2006.01)
*H04L 27/26* (2006.01)

(52) U.S. Cl.
CPC ........ *H04L 27/2075* (2013.01); *H04L 5/0051* (2013.01); *H04L 27/2071* (2013.01); *H04L 27/2613* (2013.01); *H04L 27/2614* (2013.01)

(58) Field of Classification Search
None
See application file for complete search history.

(56) References Cited

U.S. PATENT DOCUMENTS

2005/0111590 A1 5/2005 Fang et al.
2006/0067293 A1* 3/2006 Santhoff ............. H04B 1/7176
370/347

FOREIGN PATENT DOCUMENTS

WO WO-2011000110 A2 1/2011

OTHER PUBLICATIONS

International Search Report and Written Opinion—PCT/US2021/034766—ISA/EPO—dated Sep. 10, 2021.
(Continued)

*Primary Examiner* — Diane L Lo
(74) *Attorney, Agent, or Firm* — Holland & Hart LLP

(57) ABSTRACT

Methods, systems, and devices for wireless communications are described. A non-coherent modulation configuration may be selected for a transmission of a set of data based on a radio frequency spectrum band used for the transmission. After selecting the non-coherent modulation configuration, the set of data may be modulated using a differential phase shift keying modulation technique. After selecting the non-coherent modulation configuration, a set of frequency-domain symbols may be generated from the set of modulated symbols using a discrete Fourier transform. The set of frequency-domain symbols may be mapped to a set of subcarriers, and a time-domain waveform may be generated from the mapped set of frequency-domain symbols, yielding a time-domain waveform. The time-domain waveform may be transmitted over the radio frequency band.

26 Claims, 13 Drawing Sheets

(56) References Cited

OTHER PUBLICATIONS

Majed S., et al., "Single Carrier with Index Modulation for Low Power Terabit Systems", 2019 IEEE Wireless Communications and Networking Conference (WCNC), IEEE, Apr. 15, 2019 (Apr. 15, 2019), pp. 1-7, XP033651976, DOI: 10.1109/WCNC.2019.8885529 [Retrieved on Oct. 28, 2019] p. 1-p. 4.

Toender N., et al., "Low-Complexity OFDM System with High Mobility Using DAPSK Schemes", Personal, Indoor and Mobile Radio Communications, 2006 IEEE 17th International Symposium on, IEEE, PI, Sep. 1, 2006 (Sep. 1, 2006), 5 Pages, XP031023759, ISBN: 978-1-4244-0329-5, Section I, Section II, Figure 1, Section III.B, Figures 4, 5.

\* cited by examiner

SELECTING A TRANSMISSION CONFIGURATION

CROSS REFERENCE

The present application for patent claims the benefit of U.S. Provisional Patent Application No. 63/037,530 by HORN et al., entitled "SELECTING A TRANSMISSION CONFIGURATION," filed Jun. 10, 2020, assigned to the assignee hereof, and expressly incorporated by reference herein.

FIELD OF TECHNOLOGY

The present disclosure relates to wireless communications and more specifically to selecting a transmission configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM), which may also be referred to as single-carrier frequency-domain multiple access (SC-FDMA). A wireless multiple-access communications system may include one or more base stations or one or more network access nodes, each simultaneously supporting communication for multiple communication devices, which may be otherwise known as user equipment (UE).

Different technologies (e.g., OFDMA and SC-FDMA) may be associated with different levels of a peak-to-average-power ratio (PAPR). In some examples, OFDMA techniques are used for transmitting downlink information and SC-FDMA techniques are used for transmitting uplink information (e.g., due to lower PAPR characteristics being associated with SC-FDMA techniques).

SUMMARY

The described techniques relate to improved methods, systems, devices, and apparatuses that support selecting a transmission configuration. As disclosed herein, a non-coherent modulation technique may be used when communications are performed over high frequency spectrum bands. In some examples, differential phase shift keying (DPSK) modulation techniques may be used for communications performed over high frequency spectrum bands. In some examples, DPSK modulation techniques may be used for communications when a phase noise associated with communicating over a high frequency spectrum band exceeds a threshold (e.g., a predetermined threshold) and/or when a modulation and coding scheme (MCS) selected for communicating over the high frequency spectrum band exceeds another threshold (e.g., another predetermined threshold). By using DPSK modulation techniques for communications over high frequency spectrum bands, the effect of phase noise may be ignored, increasing a reliability of communications performed over the high frequency spectrum bands.

Additionally, or alternatively, a single-carrier frequency domain multiplexed (SC-FDM) transmission mode may be used with higher-order phase shift keying (PSK) modulation techniques. Unlike using higher-order quadrature amplitude modulation (QAM) with SC-FDM transmissions, a peak-to-average-power ratio (PAPR) of SC-FDM transmissions may improve (or at least not increase) when higher-order PSK modulations techniques are used—e.g., due to a smoother upsampling of higher-order PSK modulation relative to lower-order PSK modulation, such as QPSK). In some examples, higher-order PSK modulation techniques are used with SC-FDM transmissions based on an amount of upsampling performed during the generation of an SC-FDM transmission—e.g., a PSK modulation order may be increased as an amount of upsampling is increased. Thus, by using higher-order PSK modulation with an SC-FDM transmission mode, a throughput of SC-FDM communications may be increased while improving PAPR. In some examples, an SC-FDM transmission mode may be used with higher-order DPSK modulation techniques. By using higher-order DPSK modulation with an SC-FDM transmission mode, the effects of phase noise at higher frequencies may be mitigated and a throughput of SC-FDM communications may be increased while improving PAPR.

A method of wireless communication at a transmitting device is described. The method may include selecting, from a group of modulation configurations, a non-coherent modulation configuration based on a radio frequency spectrum band used by the transmitting device to communicate with a receiving device, modulating, based on the non-coherent modulation configuration, a set of data using a DPSK modulation to obtain a set of modulated symbols, generating a set of frequency-domain symbols from the set of modulated symbols using a discrete Fourier transform, and transmitting, in a symbol period of the radio frequency spectrum band, a time-domain waveform obtained from the set of frequency-domain symbols.

An apparatus for wireless communication at a transmitting device is described. The apparatus may include a processor, memory coupled with the processor, and instructions stored in the memory. The instructions may be executable by the processor to cause the apparatus to select, from a group of modulation configurations, a non-coherent modulation configuration based on a radio frequency spectrum band used by the transmitting device to communicate with a receiving device, modulate, based on the non-coherent modulation configuration, a set of data using a DPSK modulation to obtain a set of modulated symbols, generate a set of frequency-domain symbols from the set of modulated symbols using a discrete Fourier transform, and transmit, in a symbol period of the radio frequency spectrum band, a time-domain waveform obtained from the set of frequency-domain symbols.

Another apparatus for wireless communication at a transmitting device is described. The apparatus may include means for selecting, from a group of modulation configurations, a non-coherent modulation configuration based on a radio frequency spectrum band used by the transmitting device to communicate with a receiving device, modulating, based on the non-coherent modulation configuration, a set of data using a DPSK modulation to obtain a set of modulated symbols, generating a set of frequency-domain symbols from the set of modulated symbols using a discrete Fourier transform, and transmitting, in a symbol period of the radio frequency spectrum band, a time-domain waveform obtained from the set of frequency-domain symbols.

A non-transitory computer-readable medium storing code for wireless communication at a transmitting device is described. The code may include instructions executable by a processor to select, from a group of modulation configurations, a non-coherent modulation configuration based on a radio frequency spectrum band used by the transmitting device to communicate with a receiving device, modulate, based on the non-coherent modulation configuration, a set of data using a DPSK modulation to obtain a set of modulated symbols, generate a set of frequency-domain symbols from the set of modulated symbols using a discrete Fourier transform, and transmit, in a symbol period of the radio frequency spectrum band, a time-domain waveform obtained from the set of frequency-domain symbols.

Some examples of the method, apparatuses, and non-transitory computer-readable medium described herein may further include operations, features, means, or instructions for transmitting, to the receiving device, an indication that a non-coherent single-carrier frequency-domain multiple access (SC-FDMA) mode may have been selected based on the non-coherent modulation configuration being selected.

In some examples of the method, apparatuses, and non-transitory computer-readable medium described herein, the indication may be transmitted in a control channel using a coherent multiple-carrier orthogonal frequency-domain multiple access (OFDMA) mode.

Some examples of the method, apparatuses, and non-transitory computer-readable medium described herein may further include operations, features, means, or instructions for receiving, from the receiving device, a request for the non-coherent modulation configuration to be configured, where the non-coherent modulation configuration may be selected based on the request.

Some examples of the method, apparatuses, and non-transitory computer-readable medium described herein may further include operations, features, means, or instructions for identifying a phase noise associated with transmitting the set of data over the radio frequency spectrum band, where the non-coherent modulation configuration may be selected based on the phase noise exceeding a threshold.

Some examples of the method, apparatuses, and non-transitory computer-readable medium described herein may further include operations, features, means, or instructions for identifying that the radio frequency spectrum band includes a millimeter wave spectrum band, a sub-Terahertz frequency spectrum band, or both, where the non-coherent modulation configuration may be selected based on the set of data being scheduled for transmission over the millimeter wave spectrum band or the sub-Terahertz frequency spectrum band.

Some examples of the method, apparatuses, and non-transitory computer-readable medium described herein may further include operations, features, means, or instructions for identifying a modulation and coding scheme for transmitting the set of data over the radio frequency spectrum band, where the non-coherent modulation configuration may be further selected based on the modulation and coding scheme exceeding a threshold.

Some examples of the method, apparatuses, and non-transitory computer-readable medium described herein may further include operations, features, means, or instructions for identifying, for a set of DPSK constellations, a spectral efficiency associated with a communication link between the transmitting device and the receiving device based on the non-coherent modulation configuration being selected, and selecting a differential amplitude phase shift keying (DAPSK) constellation based on the spectral efficiency associated with the set of DPSK constellations being below a threshold, where the set of data may be modulated in accordance with the DAPSK constellation.

Some examples of the method, apparatuses, and non-transitory computer-readable medium described herein may further include operations, features, means, or instructions for disabling transmission of phase tracking reference signals based on the non-coherent modulation configuration being selected, and mapping a portion of the set of data to resources allocated for the phase tracking reference signals.

In some examples of the method, apparatuses, and non-transitory computer-readable medium described herein, a coding rate of the time-domain waveform may be reduced based on the mapping.

Some examples of the method, apparatuses, and non-transitory computer-readable medium described herein may further include operations, features, means, or instructions for selecting, from a group of channel access modes, a single-carrier frequency-domain multiple access (SC-FDMA) mode based on the radio frequency spectrum band, where the set of frequency-domain symbols may be generated using the discrete Fourier transform based on the SC-FDMA mode being selected.

Some examples of the method, apparatuses, and non-transitory computer-readable medium described herein may further include operations, features, means, or instructions for identifying, for the SC-FDMA mode, a spectral efficiency associated with a communication link between the transmitting device and the receiving device, and selecting a multiple-input multiple-output (MIMO)SC-FDMA mode based on the spectral efficiency associated with the SC-FDMA mode being below a threshold, where the set of frequency-domain symbols may be generated using the discrete Fourier transform based on the MIMO SC-FDMA mode.

Some examples of the method, apparatuses, and non-transitory computer-readable medium described herein may further include operations, features, means, or instructions for identifying an amount of resources allocated to the transmitting device and a carrier bandwidth configured for the transmitting device, and selecting a DPSK constellation based on a PAPR associated with communicating over the radio frequency spectrum band using the SC-FDMA mode and the DPSK constellation, where the PAPR associated with the DPSK constellation may be based on a relationship between the amount of resources allocated to the transmitting device and the carrier bandwidth, and where the set of data may be modulated in accordance with the DPSK constellation.

In some examples of the method, apparatuses, and non-transitory computer-readable medium described herein, selecting the DPSK constellation may include operations, features, means, or instructions for determining that an entry of a table that corresponds to the amount of resources and the carrier bandwidth includes an indication of the DPSK constellation.

Some examples of the method, apparatuses, and non-transitory computer-readable medium described herein may further include operations, features, means, or instructions for identifying a peak-to-average power (PAPR) threshold for communicating over the radio frequency spectrum band, identifying a first PAPR associated with communicating over the radio frequency spectrum band using the SC-FDMA mode and a first DPSK constellation of a first order, and identifying a second PAPR associated with communicating over the radio frequency spectrum band using the SC-FDMA mode and a second DPSK constellation of a second order that may be larger than the first order, where the set of data may be modulated in accordance with the second DPSK constellation based on the second PAPR being below the PAPR threshold.

In some examples of the method, apparatuses, and non-transitory computer-readable medium described herein, the group of channel access modes includes single-carrier channel access modes and multiple-carrier channel access modes.

Some examples of the method, apparatuses, and non-transitory computer-readable medium described herein may further include operations, features, means, or instructions for disabling transmission of demodulation reference signals based on a delay profile associated with communicating over the radio frequency spectrum band using a non-coherent single-carrier frequency-domain multiple access (SC-FDMA) mode, and mapping a portion of the set of data to resources allocated for the demodulation reference signals, where a coding rate of the time-domain waveform may be reduced based on the mapping.

Some examples of the method, apparatuses, and non-transitory computer-readable medium described herein may further include operations, features, means, or instructions for selecting from the group of modulation configurations, a coherent modulation configuration based on the radio frequency spectrum band, a modulation and coding scheme, a phase noise, or a combination thereof, modulating, based on the coherent modulation configuration being selected, a second set of data using a phase shift keying (PSK) modulation configuration to obtain a second set of modulated symbols, and transmitting, in a second symbol period of the radio frequency spectrum band, a second time-domain waveform based on the second set of modulated symbols.

In some examples of the method, apparatuses, and non-transitory computer-readable medium described herein, the second set of data being scheduled for transmission over a sub-millimeter wave spectrum band, the modulation and coding scheme for transmitting the second set of data over the radio frequency spectrum band being below a first threshold, the phase noise associated with transmitting the second set of data over the radio frequency spectrum band being below a second threshold, or a combination thereof.

Some examples of the method, apparatuses, and non-transitory computer-readable medium described herein may further include operations, features, means, or instructions for selecting from a group of channel access modes for communicating over the radio frequency spectrum band, a single-carrier frequency-domain multiple access (SC-FDMA) mode based on the radio frequency spectrum band, the modulation and coding scheme, the phase noise, or a combination thereof, and generating a second set of frequency-domain symbols from the second set of modulated symbols using the discrete Fourier transform based on the SC-FDMA mode, where the second time-domain waveform may be obtained from the second set of frequency-domain symbols.

Some examples of the method, apparatuses, and non-transitory computer-readable medium described herein may further include operations, features, means, or instructions for identifying a peak-to-average power (PAPR) threshold for communicating over the radio frequency spectrum band using the SC-FDMA mode, and increasing an order for the PSK modulation based on the PAPR threshold, where a PAPR of the second time-domain waveform satisfies the PAPR threshold based on the order for the PSK modulation being increased.

Some examples of the method, apparatuses, and non-transitory computer-readable medium described herein may further include operations, features, means, or instructions for mapping the second set of frequency-domain symbols to a set of subcarriers in the radio frequency spectrum band, generating a third time-domain waveform from the mapped second set of frequency-domain symbols using an inverse discrete Fourier transform, and upsampling the third time-domain waveform to obtain the second time-domain waveform.

Some examples of the method, apparatuses, and non-transitory computer-readable medium described herein may further include operations, features, means, or instructions for mapping the second set of modulated symbols to a set of subcarriers in the radio frequency spectrum band, generating a third time-domain waveform from the mapped second set of modulated symbols using an inverse discrete Fourier transform, and upsampling the third time-domain waveform to obtain the second time-domain waveform.

In some examples of the method, apparatuses, and non-transitory computer-readable medium described herein, the group of modulation configurations includes one or more coherent modulation configurations and one or more non-coherent modulation configurations.

In some examples of the method, apparatuses, and non-transitory computer-readable medium described herein, the DPSK modulation includes a differential M-ary phase shift keying modulation or a differential amplitude M-ary phase shift keying modulation.

A method of wireless communication at a receiving device is described. The method may include selecting, from a group of modulation configurations, a non-coherent modulation configuration based on a radio frequency spectrum band used by the receiving device to communicate with a transmitting device, receiving, in a symbol period of the radio frequency spectrum band, a time-domain waveform, generating a set of frequency-domain symbols from the time-domain waveform using a discrete Fourier transform, demapping the set of frequency-domain symbols from a set of subcarriers in the radio frequency spectrum band, generating a set of modulated symbols from the demapped set of frequency-domain symbols using an inverse discrete Fourier transform, and demodulating, based on the non-coherent modulation configuration, the set of modulated symbols using a DPSK demodulation to obtain a set of data.

An apparatus for wireless communication at a receiving device is described. The apparatus may include a processor, memory coupled with the processor, and instructions stored in the memory. The instructions may be executable by the processor to cause the apparatus to select, from a group of modulation configurations, a non-coherent modulation configuration based on a radio frequency spectrum band used by the receiving device to communicate with a transmitting device, receive, in a symbol period of the radio frequency spectrum band, a time-domain waveform, generate a set of frequency-domain symbols from the time-domain waveform using a discrete Fourier transform, demap the set of frequency-domain symbols from a set of subcarriers in the radio frequency spectrum band, generate a set of modulated symbols from the demapped set of frequency-domain symbols using an inverse discrete Fourier transform, and demodulate, based on the non-coherent modulation configuration, the set of modulated symbols using a DPSK demodulation to obtain a set of data.

Another apparatus for wireless communication at a receiving device is described. The apparatus may include means for selecting, from a group of modulation configurations, a non-coherent modulation configuration based on a radio frequency spectrum band used by the receiving device to communicate with a transmitting device, receiving, in a symbol period of the radio frequency spectrum band, a time-domain waveform, generating a set of frequency-domain symbols from the time-domain waveform using a discrete Fourier transform, demapping the set of frequency-domain symbols from a set of subcarriers in the radio frequency spectrum band, generating a set of modulated symbols from the demapped set of frequency-domain symbols using an inverse discrete Fourier transform, and demodulating, based on the non-coherent modulation configuration, the set of modulated symbols using a DPSK demodulation to obtain a set of data.

A non-transitory computer-readable medium storing code for wireless communication at a receiving device is described. The code may include instructions executable by a processor to select, from a group of modulation configurations, a non-coherent modulation configuration based on a radio frequency spectrum band used by the receiving device to communicate with a transmitting device, receive, in a symbol period of the radio frequency spectrum band, a time-domain waveform, generate a set of frequency-domain symbols from the time-domain waveform using a discrete Fourier transform, demap the set of frequency-domain symbols from a set of subcarriers in the radio frequency spectrum band, generate a set of modulated symbols from the demapped set of frequency-domain symbols using an inverse discrete Fourier transform, and demodulate, based on the non-coherent modulation configuration, the set of modulated symbols using a DPSK demodulation to obtain a set of data.

Some examples of the method, apparatuses, and non-transitory computer-readable medium described herein may further include operations, features, means, or instructions for receiving, from the receiving device, an indication that a non-coherent single-carrier frequency-domain multiple access (SC-FDMA) mode may have been selected for transmitting the set of data.

In some examples of the method, apparatuses, and non-transitory computer-readable medium described herein, the indication may be received in a control channel using a coherent multiple-carrier OFDMA mode.

Some examples of the method, apparatuses, and non-transitory computer-readable medium described herein may further include operations, features, means, or instructions for transmitting, to the transmitting device, a request for the non-coherent modulation configuration to be configured based on selecting the non-coherent modulation configuration.

Some examples of the method, apparatuses, and non-transitory computer-readable medium described herein may further include operations, features, means, or instructions for identifying a phase noise associated with transmitting the set of data over the radio frequency spectrum band, where the non-coherent modulation configuration may be selected based on the phase noise exceeding a threshold.

Some examples of the method, apparatuses, and non-transitory computer-readable medium described herein may further include operations, features, means, or instructions for identifying that the radio frequency spectrum band includes a millimeter wave spectrum band, a sub-Terahertz frequency spectrum band, or both, where the non-coherent modulation configuration may be selected based on the set of data being scheduled for transmission over the millimeter wave spectrum band or the sub-Terahertz frequency spectrum band.

Some examples of the method, apparatuses, and non-transitory computer-readable medium described herein may further include operations, features, means, or instructions for identifying a modulation and coding scheme for transmitting the set of data over the radio frequency spectrum band, where the non-coherent modulation configuration may be further selected based on the modulation and coding scheme exceeding a threshold.

Some examples of the method, apparatuses, and non-transitory computer-readable medium described herein may further include operations, features, means, or instructions for identifying, for a set of DPSK constellations, a spectral efficiency associated with a communication link between the receiving device and the transmitting device based on the non-coherent modulation configuration being selected, and selecting a DAPSK constellation based on the spectral efficiency associated with the set of DPSK constellations being below a threshold, where the set of data may be demodulated in accordance with the DAPSK constellation.

Some examples of the method, apparatuses, and non-transitory computer-readable medium described herein may further include operations, features, means, or instructions for determining that transmission of phase tracking reference signals may be disabled based on the non-coherent modulation configuration being selected, and receiving a portion of the set of data over resources allocated for the phase tracking reference signals.

Some examples of the method, apparatuses, and non-transitory computer-readable medium described herein may further include operations, features, means, or instructions for selecting, from a group of channel access modes, a single-carrier frequency-domain multiple access (SC-FDMA) mode based on the radio frequency spectrum band, where the set of frequency-domain symbols may be generated using the discrete Fourier transform based on the SC-FDMA mode being selected.

Some examples of the method, apparatuses, and non-transitory computer-readable medium described herein may further include operations, features, means, or instructions for identifying, for the SC-FDMA mode, a spectral efficiency associated with a communication link between the transmitting device and the receiving device, and selecting a MIMO SC-FDMA mode based on the spectral efficiency associated with the SC-FDMA mode being below a threshold, where the set of frequency-domain symbols may be generated using the discrete Fourier transform based on the MIMO SC-FDMA mode.

Some examples of the method, apparatuses, and non-transitory computer-readable medium described herein may further include operations, features, means, or instructions for identifying an amount of resources allocated to the receiving device and a carrier bandwidth configured for the receiving device, and selecting a DPSK constellation based on a PAPR associated with communicating over the radio frequency spectrum band using the SC-FDMA mode and the DPSK constellation, where the PAPR associated with the DPSK constellation may be based on a relationship between the amount of resources allocated to the transmitting device and the carrier bandwidth, and where the set of data may be demodulated in accordance with the DPSK constellation.

In some examples of the method, apparatuses, and non-transitory computer-readable medium described herein, selecting the DPSK constellation may include operations, features, means, or instructions for determining that an entry of a table that corresponds to the amount of resources and the carrier bandwidth includes an indication of the DPSK constellation.

In some examples of the method, apparatuses, and non-transitory computer-readable medium described herein, the group of channel access modes includes single-carrier channel access modes and multiple-carrier channel access modes.

Some examples of the method, apparatuses, and non-transitory computer-readable medium described herein may further include operations, features, means, or instructions for identifying a peak-to-average power (PAPR) threshold for communicating over the radio frequency spectrum band, identifying a first PAPR associated with communicating over the radio frequency spectrum band using the SC-FDMA mode and a first DPSK constellation of a first order, and identifying a second PAPR associated with communicating over the radio frequency spectrum band using the SC-FDMA mode and a second DPSK constellation of a second order that may be larger than the first order, where the set of data may be modulated in accordance with the second DPSK constellation based on the second PAPR being below the PAPR threshold.

Some examples of the method, apparatuses, and non-transitory computer-readable medium described herein may further include operations, features, means, or instructions for transmitting, to the transmitting device, a request to disable transmission of demodulation reference signals based on a delay profile associated with communicating over the radio frequency spectrum band using a non-coherent single-carrier frequency-domain multiple access (SC-FDMA) mode, and receiving a portion of the set of data over resources allocated for the demodulation reference signals.

DETAILED DESCRIPTION

Figure 1:
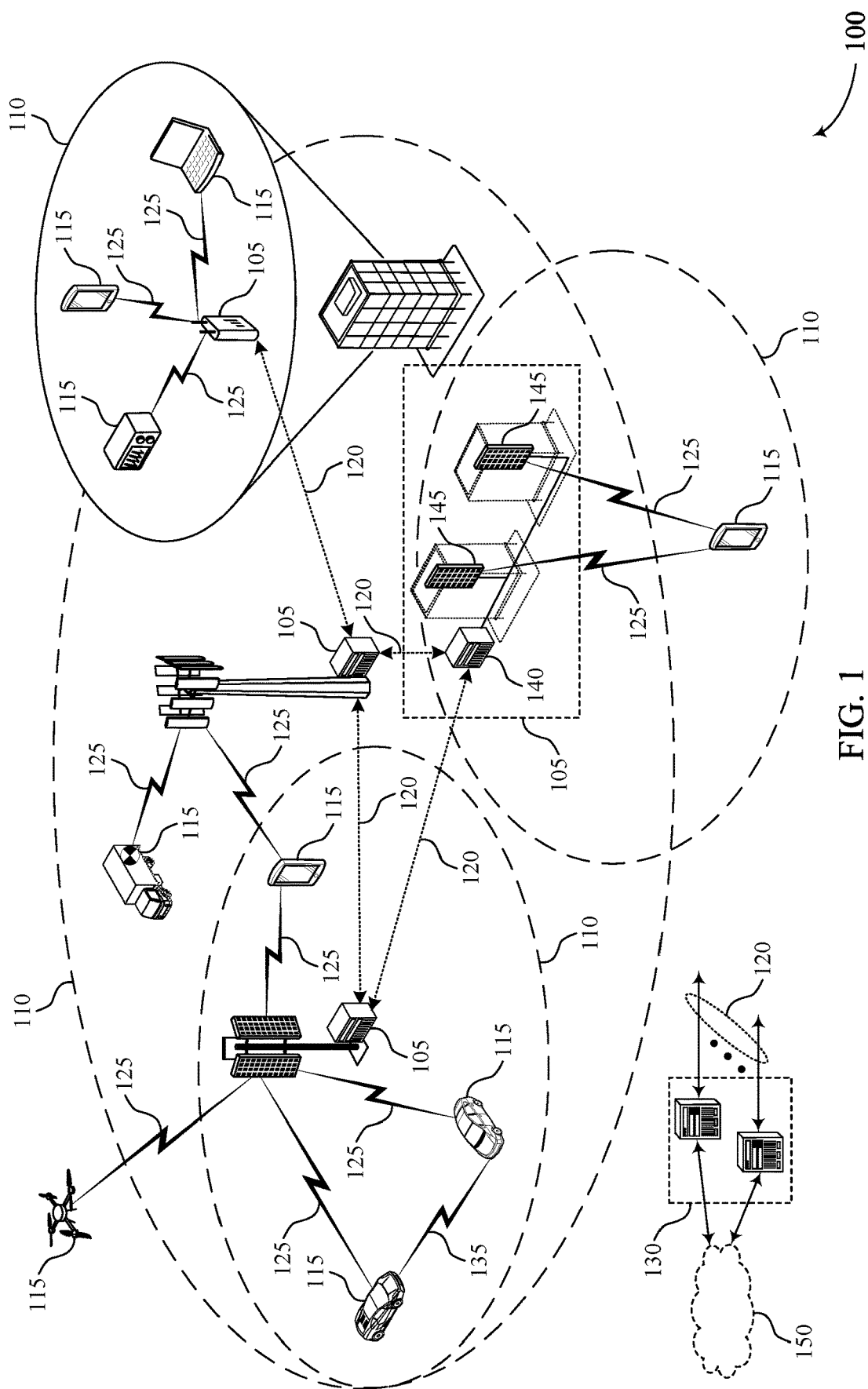
FIG. 1 illustrates an example of a system for wireless communications that supports selecting a transmission configuration in accordance with aspects of the present disclosure.

Coherent modulation techniques (e.g., phase shift keying (PSK), amplitude phase shift keying (APSK), quadrature amplitude modulation (QAM), etc.) and non-coherent modulation techniques (e.g., differential phase shift keying (DPSK), differential amplitude phase shift keying (DAPSK), etc.) may be supported by a wireless device. To support coherent modulation techniques, a transmitting device and a receiving device may keep track of a common phase reference. Non-coherent communications may be performed without using a common phase reference. Also, single-carrier channel access modes (e.g., single-carrier frequency-domain multiple access (SC-FDMA)) and multiple-carrier channel access modes (e.g., orthogonal frequency-domain multiple access (OFDMA)) may be supported by a wireless device. SC-FDMA techniques may be used with coherent modulation, such as quadrature phase shift keying (QPSK) (which may be equivalent to 4-QAM), 8-QAM, 16-QAM, and so on. Transmissions using SC-FDMA techniques ("single-carrier frequency-domain multiplexed (SC-FDM) transmissions") may, on average, have lower peak to average power ratios (PAPRs) than transmissions using OFDMA techniques ("orthogonal frequency-domain multiplexed (OFDM) transmissions").

Information may be communicated between wireless devices across a wide range of frequencies, including lower frequency spectrum bands (e.g., sub-millimeter wave (mmW) (less than about 6 GHz) frequency spectrum bands) and high radio frequency spectrum bands (e.g., mmW (greater than about 6 GHz) and sub-Terahertz (between 100 and 300 GHz) frequency spectrum bands). In high frequency spectrum bands, a performance of coherent modulations may be significantly degraded due to an increased level of phase noise (noise associated with detecting a phase of a received modulated symbol), carrier frequency offset, or both.

An SC-FDM transmission mode may be used with higher-order QAM techniques to increase throughput. But, a PAPR of SC-FDM transmissions may increase when a QAM order increases. To support higher modulation orders and the corresponding increased PAPR, a power amplifier may be configured with a larger back-off. Alternatively (e.g., in high frequency bands), SC-FDM transmissions may be limited to using QPSK modulation (or 4-QAM) techniques, decreasing a throughput of SC-FDM transmissions in high frequency bands.

To increase a performance of communications and mitigate an effect of phase noise in high frequency spectrum bands, a non-coherent modulation technique may be used when communications are performed over high frequency spectrum bands. In some examples, DPSK modulation techniques may be used for communications performed over high frequency spectrum bands. In some examples, DPSK modulation techniques may be used for communications when a phase noise associated with communicating over a high frequency spectrum band exceeds a threshold (e.g., a predetermined threshold) and/or when a modulation and coding scheme (MCS) selected for communicating over the high frequency spectrum band exceeds another threshold (e.g., another predetermined threshold). By using DPSK modulation techniques for communications over high frequency spectrum bands, the effect of phase noise may be ignored, increasing a reliability of communications performed over the high frequency spectrum bands.

Additionally, or alternatively, to increase a performance of communications and reduce PAPR in high frequency spectrum bands, an SC-FDM transmission mode may be used with higher-order PSK modulation techniques. Unlike using higher-order QAM with SC-FDM transmissions, a PAPR of SC-FDM transmissions may improve (or at least not increase) when higher-order PSK modulations techniques are used—e.g., due to a smoother upsampling of higher-order PSK modulation relative to lower-order PSK modulation, such as QPSK). In some examples, higher-order PSK modulation techniques are used with SC-FDM transmissions based on an amount of upsampling performed during the generation of an SC-FDM transmission—e.g., a PSK modulation order may be increased as an amount of upsampling is increased. Thus, by using higher-order PSK modulation with an SC-FDM transmission mode, a throughput of SC-FDM communications may be increased while improving PAPR.

In some examples, to further increase a performance of communications in high frequency spectrum bands, an SC-FDM transmission mode may be used with higher-order DPSK modulation techniques. By using higher-order DPSK modulation with an SC-FDM transmission mode, the effects of phase noise at higher frequencies may be mitigated and a throughput of SC-FDM communications may be increased while improving PAPR.

Aspects of the disclosure are initially described in the context of a wireless communications system. Specific examples are then described of a process flow for selecting a transmission configuration. Aspects of the disclosure are further illustrated by and described with reference to apparatus diagrams, system diagrams, and flowcharts that relate to selecting a transmission configuration.

FIG. 1 illustrates an example of a wireless communications system that supports selecting a transmission configuration in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A wireless communications system 100 may support multiple types of modulation techniques for conveying data between transmitting and receiving devices. Different types of modulation techniques may map logic values to different sets of modulation symbols, where each modulated symbol may be associated with a unique amplitude and/or phase. The different techniques may include coherent and/or non-coherent modulation techniques. For a coherent modulation technique, each modulated symbol may be associated with a respective amplitude and a respective phase (e.g. one of 0, 90, 180, or 270 degrees). Also, for a coherent modulation technique, a transmitting device and a receiving device may keep track of a common phase reference so that a phase determined by a receiving device for a received modulated symbol corresponds to the phase used by a transmitting device to transmit the modulated symbol. In some examples, the transmitting device and receiving device use a phase locked loop to maintain the common phase reference and to accommodate for phase drift that may occur during operation. For a non-coherent modulation technique, each modulated symbol may be associated with a respective amplitude and a "relative phase." Thus, for a non-coherent modulation technique, a transmitting device and a receiving device may not keep track of a common phase reference—e.g., because the receiving device may use a relative phase difference between consecutive modulated symbols to determine a logic value associated with a received symbol rather than an actual phase of a received modulated symbol.

Reference signals may be used to support coherent modulation. For example, a phase tracking reference signal (PTRS) may be transmitted by a transmitting device and used by a receiving device to lock onto a phase reference being used by the transmitting device. A transmitting device may transmit the PTRS over dedicated communication resources, which may increase overhead and decrease throughput for a communication. In some examples, PTRS transmissions may decrease throughput for a communication (e.g., by up to or around five percent).

Different types of modulation techniques include PSK modulation, APSK modulation, QAM, DPSK modulation, and DAPSK modulation. PSK modulation and QAM may be associated with coherent modulation, while DPSK modulation may be associated with non-coherent modulation. A first set of PSK modulation techniques (which may simply be referred to as PSK modulation) may be associated with a set of modulation symbols that have a same amplitude and unique phases that are distributed across a range of available phases (e.g., across a 360 degree or a radian range). The first set of PSK modulation techniques may include a binary phase shift keying (BPSK) modulation technique (which may include two modulation symbols), a QPSK modulation technique (which may include four modulation symbols), 8-PSK (which may include eight modulation symbols), and so on. In some cases, an order of a modulation technique may be based on a number of modulation symbols supported by the modulation technique—e.g., QPSK may be a fourth-order modulation technique). Another set of PSK modulation techniques (which may be referred to as APSK modulation) may be associated with a first set of modulation symbols that have a first amplitude and unique phases and a second set of modulation symbols that have a different (e.g., larger) amplitude and unique phases. A QAM technique may be associated with a set of modulation symbols that have different amplitude and phase combinations and that are equidistant from one another. Different QAM techniques may include different quantities of modulation symbols (e.g., 4-QAM, 8-QAM, 16-QAM, 32-QAM, and so on). In some cases, 4-QAM may be equivalent to QPSK modulation.

A first set of DPSK modulation techniques (which may simply be referred to as DPSK modulation) may be associated with a set of modulation symbols that have a same amplitude and unique "relative phases" that are distributed across a range of available phases. Unlike PSK modulation, the actual phase associated with a DPSK symbol may change over time, while the relative phase (or a difference in phase) between DPSK symbols may remain constant. A DPSK modulated symbol may be represented as $x_k = x_{k-1} s_k$, $k \geq 0$, where $x_k$ refers to the kth modulated symbol, $x_{k-1}$ refers to the k−1th modulated symbol, and $s_k$ refers to the kth data symbol, assuming $x_{-1}=1$. A second set of DPSK modulation techniques (which may be referred to as DAPSK) may be associated with a first set of modulation symbols that have a first amplitude and unique relative phases that are distributed across a range of available phases and a second set of modulation symbols that have a second amplitude and unique relative phases that are distributed across the range of available phases.

For each modulation technique, the corresponding pattern of modulation symbols may be referred to as a modulation constellation. A spectral efficiency associated with a modulation constellation may be based on a distance between modulation symbols in a modulation constellation. For example, a spectral efficiency may be higher for a modulation constellation including modulation symbols that are spaced farther apart (as a function of amplitude and phase) than another modulation constellation. In some cases, a spectral efficiency associated with a PSK modulation constellation that includes modulation symbols of a single amplitude decreases as more modulation symbols are added—e.g., due to a smaller distance between modulation symbols. By contrast, a spectral efficiency associated with a QAM constellation may remain constant as more modulation symbols are added—e.g., due to a constant distance being maintained between modulation symbols.

The wireless communications system 100 may similarly support demodulation techniques for conveying data between transmitting and receiving devices. The demodulation techniques may be used to map a received set of modulated symbols to modulation symbols of a modulation constellation and to determine data values associated with the modulated symbols. Mapping the modulated symbols to the modulation constellation may involve determining an amplitude and phase of the received set of modulated symbols. A demodulated DPSK symbol may be represented as $z_k = y_k y_{k-1}^*$ where $z_k$ refers to the kth demodulated symbol, $y_k$ refers to the kth received symbol, and $y_{k-1}^*$ refers to the complex conjugate of the k−1th data symbol. The demodulated DPSK symbol may also be represented as $z_k = (h_k x_k + v_k)(h_{k-1} x_{k-1} + v_{k-1})^* \Rightarrow (h_k x_{k-1} s_k + v_k)(h_{k-1} x_{k-1} + v_{k-1})^*$, where $h_k$ refers to the channel/phase noise response and $v_k$ refers to the noise associated with the channel. Since the characteristics of the channel are unlikely to significantly change between two symbols, the channel/phase noise response between two symbols may be assumed to be the same—that is, the phase noise may be canceled. Thus, $z_k$ may be represented as $(h_k x_{k-1} s_k + v_k)(h_k x_{k-1} + v_{k-1})^*$. The minimum mean square error combining vector $\hat{m}$ may be equal to $\operatorname{argmin}_m\{|\angle z_k - \theta_m|^2\}$ and the estimated data symbol $\hat{s}_k$ may be equal to $e^{j\hat{\theta}_{\hat{m}}}$. Other demodulation techniques may be used to estimated data symbol $\hat{s}_k$, including maximum likelihood decoding and iterative decoding techniques. Demodulation may be similarly performed for DAPSK symbols.

A wireless communications system 100 may support multiple modes for accessing a wireless channel, including an OFDM channel access mode (which may also be referred to as OFDMA) and an SC-FDM channel access mode (which may also be referred to SC-FDMA). A wireless device that performs transmissions according to an OFDM channel access mode may be referred to as being in an OFDM transmission mode. A wireless device that performs transmissions according to an SC-FDM channel access mode may be referred to as being in an SC-FDM transmission mode. An OFDM transmission mode may involve mapping each modulated symbol of a set of modulated symbols to unique time and frequency communication resources prior to transmission a channel. An SC-FDM transmission mode may involve spreading a set of modulated symbols across a set of frequency communication resources that occur during a same time period (e.g., a symbol period) prior to transmission over a channel. The SC-FDM transmission mode may support a localized SC-FDM transmission mode and/or a distributed SC-FDM transmission mode. A localized SC-FDM transmission mode may include mapping a set of frequency-domain symbols to a consecutive set of subcarriers, where the set of subcarriers is a subset of a larger set of subcarriers included in a carrier. A distributed SC-FDM transmission mode may include mapping a set of frequency-domain symbols to a distributed set of subcarriers, where the set of subcarriers is distributed (e.g., evenly) across a larger set of subcarriers included in a carrier. In some cases, a signal transmitted during a symbol period in accordance with an OFDM transmission mode may be referred to as an OFDM symbol. And a signal transmitted during a symbol period in accordance with an SC-FDM transmission mode may be referred to as an SC-FDM symbol.

Reference signals may be used to support OFDM and SC-FDMA transmissions. For example, a demodulation reference signal (DMRS) may be transmitted by a transmitting device and used by a receiving device for time-domain equalization. That is, the signal components of an OFDM symbol or SC-FDM symbol transmitted over different subcarriers during a symbol period may arrive at a receiving device at different times. The receiving device may use a DMRS to resolve and/or adjust for the delay between the different signal components, increasing a likelihood that an OFDM symbol or SC-FDM symbol will be successfully decoded. A transmitting device may transmit the DMRS over dedicated communication resources, which may increase overhead and decrease throughput for a communication.

A transmit chain used to transmit an SC-FDM transmission may include multiple stages. A first stage of the transmit chain (e.g., a data modulator) may be used to map data to a modulated symbol of a selected modulation constellation. A second stage of the transmit chain (e.g., a serial-to-parallel converter) may be used to select a set of modulated symbols from a stream of modulated symbols. A third stage of the transmit chain (e.g., a DFT) may be used to generate a set of frequency-domain symbols corresponding to the set of modulated symbols. A fourth stage of the transmit chain may be used to map the set of frequency-domain symbols to a set of subcarriers allocated to the transmitting device. A fifth stage of the transmit chain (e.g., an inverse discrete Fourier transform (IDFT)) may be used to convert the mapped frequency-domain symbols to a time-domain signal based on the set of subcarriers. A sixth stage of the transmit chain (e.g., a parallel-to-serial converter) may be used to finish construction of the time-domain signal. A seventh stage of the transmit chain may be used to add a cyclic prefix to the time-domain signal. The seventh stage of the transmit chain may also be used to apply pulse shaping to the time-domain signal, which may include oversampling and interpolating the time-domain signal. And an eighth stage of the transmit chain may be used to transmit the pulse-shaped time-domain signal—i.e., the SC-FDM transmission. A transmit chain used to transmit an OFDM transmission may be similarly configured, but may exclude the third stage (e.g., the DFT) of the SC-FDM transmission chain.

A transmitting device may use a power amplifier to amplify signals prior to transmission. To avoid introducing non-linearities into a transmitted signal, the power amplifier may be configured with back-off so that the power amplifier is primarily operated in a linear region. The amount of back-off configured for the power amplifier may be based on an expected PAPR of a transmission. PAPR indicates a difference between a peak power and an average power used to transmit signals over a channel. That is, a power amplifier may be configured to operate, on average, in a lower operating region so that the power amplifier avoids entering a non-linear region when transmitting at a peak power—e.g., if the PAPR is equal to two, a power amplifier may be configured to operate, on average, in a region that is half of an upper bound of the linear operating region for the power amplifier. Thus, as PAPR decreases, the amount of back-off configured for a power amplifier may also decrease, increasing an efficiency and reducing a complexity of the power amplifier.

Transmissions performed using an SC-FDM transmission mode may have a lower PAPR than transmissions performed using an OFDM transmission mode—e.g., based on mixing a set of modulated symbols together before mapping the set of modulated symbols to the set of frequency resources. In some cases, a PAPR associated with an SC-FDM transmission may be based on a modulation technique used in combination with the SC-FDM transmission mode. In some examples, an SC-FDM transmission mode may use a QPSK modulation (or 4-QAM). In other examples, an SC-FDM transmission mode may use a higher-order QAM (e.g., 8-QAM or 16-QAM). The PAPR associated with an SC-FDM transmission may increase as the QAM order increases. For example, an SC-FDM transmission mode that uses 16-QAM may have a PAPR that is at least a decibel (dB) higher than if QPSK (or 4-QAM) is used—e.g., due to the higher amplitudes used to represent the additional modulation symbols. The PAPR associated with the SC-FDM transmission may also be based on an amount (or rate) of upsampling that occurs during the generation of an SC-FDM transmission—e.g., the PAPR for a same modulation technique (e.g., QPSK) may be increased as an amount of upsampling is increased. In some cases, the amount of upsampling is based on a size of a set of frequency resources (e.g., a number of subcarriers) allocated to a transmission and a size of a carrier (e.g., a carrier bandwidth) associated with the transmission—e.g., the amount of upsampling may increase as a size of the set of frequency resources (that is, as a size of a resource allocation) and/or as a size of the carrier increases.

A wireless communications system 100 may support communications over a wide range of frequency bands including a sub-mmW frequency band (e.g., <6 GHz), a mmW frequency band (e.g., between 6 GHz and 100 GHz), and/or a sub-Terahertz (e.g., between 100 and 300 GHz). The mmW and sub-Terahertz frequency band may be referred to as high frequency bands. In high frequency bands, a channel between a transmitting device and a receiving device may approach a single tap (or flat) channel. Thus, all, or a majority, of signal components of an OFDM symbol transmission or SC-FDM symbol transmission (e.g., the components of an OFDM or SC-FDM symbol transmitted over different subcarriers) may be received nearly simultaneously at a receiving device.

In high frequency bands, phase noise (noise associated with detecting a phase of a received modulated symbol, such as an OFDM or SC-FDMA symbol) may become large e.g., due to the high rate of change in phase that occurs at high frequencies. Also, in high frequency bands, a frequency carrier offset (a difference between a carrier frequency used to upconvert an information signal and a carrier frequency used to downconvert an information signal) may become large. In some cases, the performance of coherent communications may be significantly degraded in high frequency bands by the increased phase noise and/or carrier frequency offset. The performance of coherent communications may be considered significantly degraded when communication failure rates exceed a threshold (e.g., a predetermined threshold). Additionally, in high frequency bands, the negative effects of an increased PAPR on transmission may be increased. In some cases, a transmitting device may refrain from using an SC-FDM transmission mode that employs higher-order QAM constellations that are associated with increased PAPRs when communicating over a high frequency band. For example, the SC-FDM transmission mode may be limited to being used with QPSK modulation in higher frequency ranges. Limiting an SC-FDM transmission mode to QPSK modulation may decrease a throughput of SC-FDM communications performed over high frequency bands.

To increase a performance of communications and mitigate an effect of phase noise in high frequency spectrum bands, a non-coherent modulation technique may be used when communications are performed over high frequency spectrum bands. In some examples, DPSK modulation techniques may be used for communications performed over high frequency spectrum bands. In some examples, DPSK modulation techniques may be used for communications when a phase noise associated with communicating over a high frequency spectrum band exceeds a threshold (e.g., a predetermined threshold) and/or when a modulation and coding scheme (MCS) selected for communicating over the high frequency spectrum band exceeds another threshold (e.g., another predetermined threshold). By using DPSK modulation techniques for communications over high frequency spectrum bands, the effect of phase noise may be ignored, increasing a reliability of communications performed over the high frequency spectrum bands.

Additionally, or alternatively, to increase a performance of communications and reduce PAPR in high frequency spectrum bands, an SC-FDM transmission mode may be used with higher-order PSK modulation techniques. Unlike using higher-order QAM with SC-FDM transmissions, a PAPR of SC-FDM transmissions may improve (or at least not increase) when higher-order PSK modulations techniques are used—e.g., due to a smoother upsampling of higher-order PSK modulation relative to lower-order PSK modulation, such as QPSK). In some examples, higher-order PSK modulation techniques are used with SC-FDM transmissions based on an amount of upsampling performed during the generation of an SC-FDM transmission—e.g., a PSK modulation order may be increased as an amount of upsampling is increased. Thus, by using higher-order PSK modulation with an SC-FDM transmission mode, a throughput of SC-FDM communications may be increased while improving PAPR.

In some examples, to further increase a performance of communications in high frequency spectrum bands, an SC-FDM transmission mode may be used with higher-order DPSK modulation techniques. By using higher-order DPSK modulation with an SC-FDM transmission mode, the effects of phase noise at higher frequencies may be mitigated and a throughput of SC-FDM communications may be increased while improving PAPR.

Figure 2:
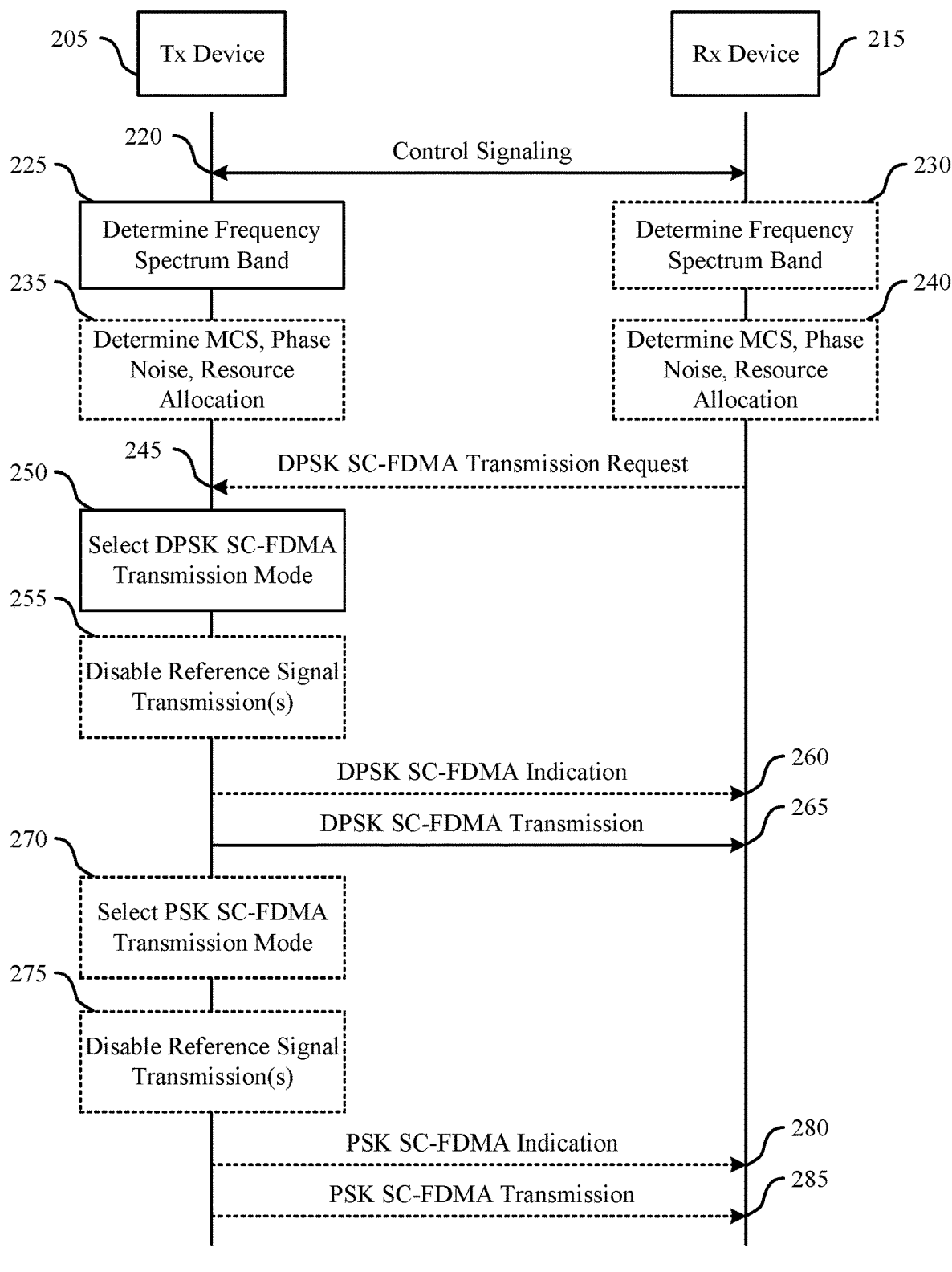
FIG. 2 illustrates an example of a process flow that supports selecting a transmission configuration in accordance with aspects of the present disclosure.

FIG. 2 illustrates aspects of a process for selecting a transmission configuration in accordance with various aspects of the present disclosure.

In some examples, process flow 200 illustrates an exemplary sequence of operations performed to support selecting a transmission configuration. For example, process flow depicts control signaling (e.g., radio resource control (RRC) signaling) that may be exchanged and processing that may be performed to support selecting a transmission configuration. One skilled in the art would understand that one or more of the operations described in process flow 200 may be performed earlier or later in the process, omitted, replaced, supplemented, or any combination thereof. Also, additional operations described herein that are not included in process flow 200 may be included. Process flow 200 may be performed by transmitting device 205 and receiving device 215.

Transmitting device 205 may be either a base station or a UE, as described with reference to FIG. 1. Receiving device 215 may be either a base station or a UE, as describe with reference to FIG. 1. When transmitting device 205 is a UE, a transmission from transmitting device 205 may be referred to as an uplink transmission. When transmitting device 205 is a base station, a transmission from transmitting device 205 may be referred to as a downlink transmission. Transmissions from receiving device 215 may be similarly classified as either downlink or uplink transmissions based on whether receiving device 215 is a UE or base station.

At 220, transmitting device 205 and receiving device 215 may exchange control signaling (e.g., RRC signaling). Receiving device 215 may signal a capability of performing SC-FDM transmissions using DPSK modulation techniques—e.g., when receiving device 215 is a UE. Transmitting device 205 may transmit a control message that configures receiving device 215 to perform SC-FDM transmissions using DPSK modulation techniques—e.g., when transmitting device 205 is a base station. Transmitting device 205 may also transmit a control message that configures receiving device 215 to perform communications over a set of frequency spectrum bands, including, but not limited to, high frequency spectrum bands—e.g., when transmitting device 205 is a base station.

Transmitting device 205 may transmit an indication to receiving device 215 indicating that transmitting device 205 is configured to perform subsequent transmissions using an SC-FDM transmission mode with DPSK modulation techniques. In some examples, transmitting device 205 may transmit a message to receiving device 215 indicating parameters for determining when an SC-FDM transmission mode with DPSK modulation is to be used. For example, transmitting device 205 may transmit an indication to receiving device 215 indicating that transmitting device 205 is configured to perform subsequent transmissions using an SC-FDM transmission mode with DPSK modulation techniques for a set of frequency spectrum bands. The indication may further indicate that the subsequent transmissions use an SC-FDM transmission mode with DPSK modulation techniques are used for the set of frequency spectrum bands when one of a set of MCS values are selected. The indication may further indicate that the subsequent transmissions use an SC-FDM transmission mode with DPSK modulation techniques are used for the set of frequency spectrum bands when phase noise exceeds a threshold (e.g., a predetermined threshold).

At 225, transmitting device 205 may determine a frequency spectrum band over which a subsequent transmission to receiving device 215 is, or will be scheduled. In some examples, transmitting device 205 determines that the transmission is to be transmitted using a carrier in a high frequency spectrum band (e.g., a mmW or sub-Terahertz frequency spectrum band). In some cases, transmitting device 205 determines that communications between transmitting device 205 and receiving device 215 will be performed over a high frequency spectrum band based on the exchanged control signaling.

At 230, receiving device 215 may similarly determine the frequency spectrum band over which transmissions from transmitting device 205 will be received. Receiving device 215 may also determine that a same or another frequency spectrum band is to be used for transmissions from receiving device 215 to transmitting device 205.

At 235, transmitting device 205 may determine a value associated with an MCS—e.g., based on a channel quality, delay spread, and channel matrix determined for the high frequency spectrum band. Transmitting device 205 may also determine a phase noise for the high frequency spectrum band. In some cases, receiving device 215 may determine characteristics for the high frequency spectrum band (including channel quality, channel type, and phase noise) based on reference signals received at transmitting device 205. In some cases, transmitting device 205 determines an MCS and/or phase noise for transmissions to receiving device 215 based on a channel feedback report received from receiving device 215—e.g., when transmitting device 205 is a base station. Transmitting device 205 may additionally determine an allocation of resources in the high frequency spectrum band for a transmission between transmitting device 205 and receiving device 215.

At 240, receiving device 215 may similarly determine a value associated with an MCS, a phase noise, and/or resource allocation for a transmission from transmitting device 205. In some examples, receiving device 215 may determine the resource allocation for the transmission—e.g., when receiving device 215 is a base station.

At 245, receiving device 215 may transmit a request to transmitting device 205 requesting (or directing) transmitting device 205 to use a non-coherent SC-FDMA transmission mode (e.g., a DPSK SC-FDMA transmission mode). In some examples, receiving device 215 may transmit the request after determining that a phase noise associated with communications over the high frequency spectrum is above a threshold value. Additionally, or alternatively, receiving device 215 may transmit the request after determining that an MCS value determined for communications over the high frequency spectrum is above a threshold value.

At 250, transmitting device 205 may select a non-coherent SC-FDMA transmission mode (e.g., DPSK SC-FDMA) for performing a subsequent transmission to receiving device 215. In some cases, transmitting device 205 may select the non-coherent SC-FDMA transmission mode based on determining that the subsequent transmission is to be performed using a high frequency spectrum band. Additionally, or alternatively, transmitting device 205 may select the non-coherent SC-FDMA transmission mode based on determining that a phase noise associated with transmitting to receiving device 215 is above a threshold. In some cases, after determining that the transmission is to be performed over the high frequency spectrum and/or that the phase noise is above a threshold, transmitting device 205 may select the non-coherent SC-FDMA transmission mode based on determining that an MCS value for the transmission is above a threshold (e.g., above MCS 10). In some cases, after determining that the transmission is to be performed over the high frequency spectrum and/or that the phase noise is above a threshold, transmitting device 205 may select the non-coherent SC-FDMA transmission mode based on determining that a quantity of subcarriers allocated to the transmission is above a threshold and/or that a carrier size is above a threshold. By selecting a non-coherent modulation technique, a phase noise and carrier frequency offset component between modulation symbol transmissions may be canceled.

In some examples, transmitting device 205 may select an SC-FDMA transmission mode that uses a DPSK modulation technique for the non-coherent SC-FDMA transmission mode. By selecting a DPSK modulation technique, the effects of phase noise associated with communications between transmitting device 205 and receiving device 210 may be mitigated. After selecting the DPSK SC-FDMA transmission mode, transmitting device 205 may select a modulation order (e.g., D-BPSK or D-QPSK) for the DPSK modulation used with the SC-FDMA transmission mode. In some examples, transmitting device 205 may select a higher modulation order (e.g., D-8PSK, D-16PSK, etc.) to decrease a PAPR of a subsequent transmission to receiving device 215—e.g., an SC-FDMA transmission mode that uses 8PSK may exhibit a PAPR improvement (e.g., about 1 dB, or less than 1 dB PAPR improvement) relative to an SC-FDMA transmission mode that uses QPSK. Selecting the higher modulation order may also increase a throughput/spectral efficiency of the subsequent transmission. In some examples, transmitting device 205 selects a modulation order based on an allocation of resources to the transmission and a carrier bandwidth—e.g., the amount of PAPR gain between modulation orders may be based on a size of the resource allocation and/or a size the carrier bandwidth. In some examples, transmitting device 205 may determine the modulation order based on a lookup table that is used to select a modulation order for a particular resource allocation/carrier bandwidth combination. Additionally, or alternatively, transmitting device 205 may select a modified DPSK modulation technique, DAPSK, to perform the subsequent transmission. The DAPSK modulation technique increase a spectral efficiency of the subsequent transmission and, like DPSK, may similarly be used to mitigate the effects of phase noise. In some cases, the standard DPSK modulation technique may have a lower PAPR than the DAPSK modulation technique.

In some examples, transmitting device 205 may select a non-coherent MIMO SC-FDMA transmission mode that uses a DPSK modulation. The MIMO DPSK SC-FDMA transmission mode may increase a spectral efficiency of the subsequent transmission. In some cases, the standard DPSK SC-FDMA transmission mode may have a lower PAPR than the MIMO DPSK SC-FDMA transmission mode.

At 255, transmitting device 205 may disable one or more reference signal transmissions associated with the subsequent transmission. In some examples, transmitting device 205 may disable a PTRS (or other reference signal used for phase tracking) transmission associated with the subsequent transmission based on selecting the non-coherent SC-FDMA transmission mode. By disabling PTRS transmissions a throughput of communications between transmitting device 205 and receiving device 215 may be increased (e.g., by up to or about five percent). Transmitting device 205 may also disable a DMRS (or other reference signal used for time-domain equalization) transmission associated with the subsequent transmission based on a power delay profile for the channel. A power delay profile for a channel in a high frequency spectrum band may approach a one-tap (or flat) channel. That is, all (or a majority) of the components of a symbol transmission transmitted from transmitting device 205 may reach receiving device 215 in a similar (or same) amount of time. By disabling DMRS transmissions a throughput of communications between transmitting device 205 and receiving device 215 may be increased (e.g., by up to or about five percent).

At 260, transmitting device 205 may transmit an indication to receiving device 215 that a non-coherent SC-FDMA transmission mode is being used for a subsequent transmission to receiving device 215. In some cases, the indication is included in downlink control information that is transmitted over a control channel (e.g., PDCCH) resources.

At 265, transmitting device 205 may perform a transmission in accordance with the selected non-coherent SC-FDMA transmission mode. The transmission may be performed over communications resources in a high frequency spectrum band. In some examples, transmitting device 205 transmits data over communication resources that would otherwise be allocated to PTRS transmission—e.g., when PTRS transmission is disabled. Additionally, or alternatively, transmitting device 205 transmits data over communication resources that would otherwise be allocated to DMRS transmission—e.g., when DMRS transmission is disabled. Receiving device 215 may receive the transmission in accordance with the selected non-coherent SC-FDMA transmission mode.

At 270, transmitting device 205 may select a coherent modulation technique—e.g., based on the frequency spectrum band scheduled for a subsequent transmission, an MCS value for the subsequent transmission, a phase noise associated with the subsequent transmission, or any combination thereof. In some examples, transmitting device 205 may select the coherent modulation scheme when the subsequent transmission is scheduled to be in a high frequency spectrum band and an MCS value for the subsequent transmission is below a threshold. In some examples, transmitting device 205 may select the coherent modulation scheme when the phase noise is above a threshold and an MCS value for the subsequent transmission is below a threshold. In some examples, transmitting device 205 may select the coherent modulation scheme when the subsequent transmission is scheduled to be in a high frequency spectrum band and a phase noise for the subsequent transmission is below a threshold.

In some examples, transmitting device 205 may select a PSK modulation technique to use with the SC-FDMA transmission mode. After selecting the PSK SC-FDMA transmission mode, transmitting device 205 may select a modulation order (e.g., BPSK or QPSK) for the PSK modulation used with the SC-FDMA transmission mode. In some examples, transmitting device 205 may select a higher modulation order (e.g., 8PSK, 16PSK, etc.) to decrease a PAPR of a subsequent transmission to receiving device 215. Selecting the higher modulation order may also increase a spectral efficiency of the subsequent transmission. In some examples, transmitting device 205 selects a modulation order based on an allocation of resources to the transmission and a carrier bandwidth—e.g., the amount of PAPR gain between modulation orders may be based on a size of the resource allocation and/or a size of the carrier bandwidth. In some examples, transmitting device 205 may determine the modulation order based on a lookup table that is used to select a modulation order for a particular resource allocation/carrier bandwidth combination. Additionally, or alternatively, transmitting device 205 may select a modified PSK modulation technique, APSK, to perform the subsequent transmission. The APSK modulation technique may increase a spectral efficiency of the subsequent transmission. In some cases, the standard PSK modulation technique may have a lower PAPR than the APSK modulation technique.

At 275, transmitting device 205 may disable one or more reference signal transmissions associated with the subsequent transmission. In some examples, transmitting device 205 may disable a DMRS transmission associated with the subsequent transmission based on a power delay profile for the channel.

At 280, transmitting device 205 may transmit an indication to receiving device 215 that a coherent SC-FDMA transmission mode is being used for a subsequent transmission to receiving device 215. In some cases, the indication is included in downlink control information that is transmitted over a control channel (e.g., PDCCH) resources.

At 285, transmitting device 205 may perform a transmission in accordance with the selected coherent SC-FDMA transmission mode. The transmission may be performed over communications resources in a high frequency spectrum band. In some examples, transmitting device 205 transmits data over communication resources that would otherwise be allocated to DMRS transmission—e.g., when DMRS transmission is disabled. Receiving device 215 may receive the transmission in accordance with the selected coherent SC-FDMA transmission mode. In some examples, the operations described at 270 through 285 may be performed instead of the operations described at 250 through 265.

In some examples, instead of selecting a coherent SC-FDMA transmission mode at 270, transmitting device 205 may select an OFDMA transmission mode—e.g., based on the frequency spectrum band scheduled for a subsequent transmission, an MCS value for the subsequent transmission, a phase noise associated with the subsequent transmission, or any combination thereof. Transmitting device 205 may indicate to receiving device 215 that the OFDMA transmission mode is selected.

Figure 3A:
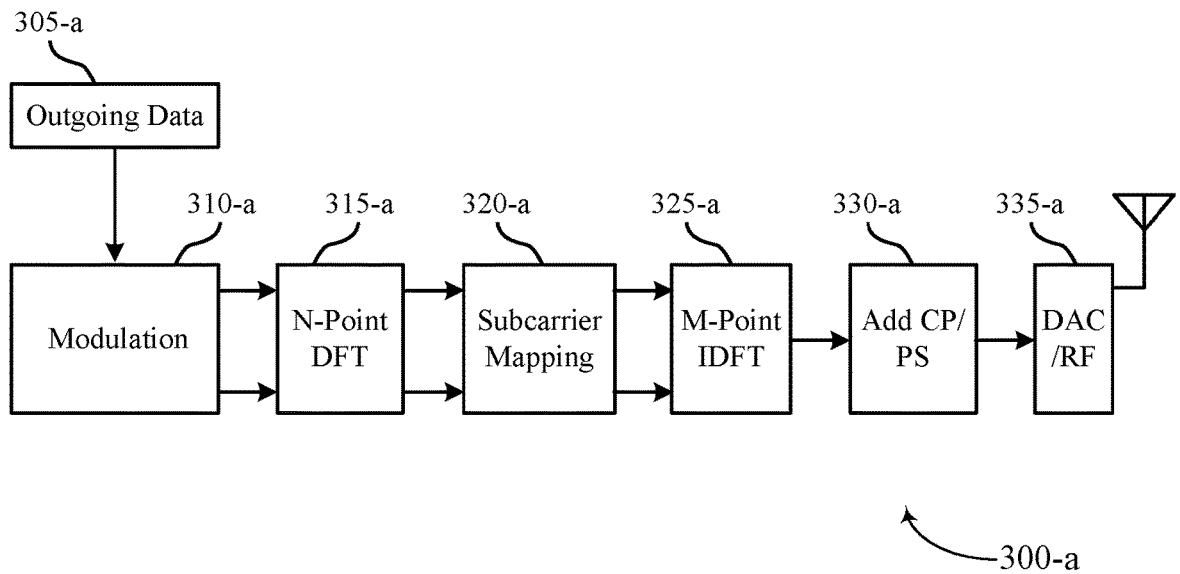
FIGS. 3A and 3B illustrate example radio frequency (RF) chains that support selecting a transmission configuration in accordance with aspects of the present disclosure.

FIG. 3A illustrates aspects of a radio frequency (RF) chain for selecting a transmission configuration in accordance with various aspects of the present disclosure.

Transmission chain 300-a may be configured to generate an SC-FDMA transmission that conveys a set of data in a symbol period of a slot. Transmission chain 300-a may include modulation component 310-a, DFT component 315-a, subcarrier mapping component 320-a, IDFT component 325-a, signal processing component 330-a, and transmission component 335-a.

Modulation component 310-a may be configured to map data (e.g., 1 or more bits of data) to modulation symbols of a modulation constellation that corresponds to a configured modulation technique (e.g., a non-coherent or coherent modulation technique). In some examples, modulation component 310-a may be configured to use a non-coherent modulation technique, such as DPSK or DAPSK. In other examples, modulation component 310-a may be configured to use coherent modulation techniques, such as PSK or QAM. Modulation component 310-a may also be configured to provide a set of modulated symbols to DFT component 315-a. Modulation component 310-a may use one of a coherent modulation or non-coherent modulation technique based on a determination made in accordance with the description herein and with reference to FIG. 2. In some examples, modulation component 310-a may be configured to provide N modulated symbols to DFT component 315-a. In some cases, the N modulated symbols may be arranged in a parallel fashion, in time.

DFT component 315-a may be configured to generate a set of frequency-domain symbols from the set of modulated symbols received from modulation component 310-a. DFT component 315-a may be an N-Point DFT and may generate N frequency-domain symbols.

Subcarrier mapping component 320-a may be configured to map the set of frequency-domain symbols to a set of subcarriers. In some cases, subcarrier mapping component 320-a may be configured to map N frequency-domain symbols generated at DFT component 315-a to N subcarriers allocated to the transmission. In some examples, the number of subcarriers available for mapping may be based on a number of communication resources (e.g., a number of resource blocks) allocated to the transmission.

IDFT component 325-a may be configured to generate a time-domain signal from the set of frequency-domain signals. The time-domain signal may include a modified version of the set of modulated symbols provided to the DFT component 315-a as well as weighted sums of the modulated symbols. IDFT component 325-a may be configured to generate the time-domain signal based on a bandwidth of a carrier configured for transmissions. The carrier may include M subcarriers. In some cases, the modified set of modulated symbols may be arranged in a serial fashion, in time. In some examples, the time-domain signal is considered an SC-FDM symbol. In some examples, the time-domain signal may be upsampled as a result of converting the set of frequency-domain symbols to the time-domain signal. The amount of upsampling may be based on a number of subcarriers (N) allocated to the transmission and a number of subcarriers (M) included in a carrier that comprises the transmission.

Signal processing component 330-a may be configured to add a cyclic prefix to the time-domain signal. Signal processing component 330-a may also be configured to apply pulse shaping techniques to the time-domain signal. The pulse shaping process may include upsampling the time-domain signal by a factor of four.

Transmission component 335-a may be configured to convert the time-domain signal from a digitized version to an analog version of the time-domain signal—e.g., the transmission component 335-a may interpolate the upsampled and digitized version of the time-domain signal. Transmission component 335-a may also be configured to generate an RF signal for transmitting the analog version of the time-domain signal. Transmission component 335-a may include a power amplifier that is used to generate the analog version of the time-domain signal. An output of the power amplifier may be coupled with an RF antenna that is used to wirelessly transmit the time-domain signal over a channel.

In some examples, modulation component 310-a maps a set of data 305-a (e.g., a set of bits, such as "01010001001") to a set of modulation symbols of a configured symbol constellation. In some examples, modulation component 310-a may configure (or be configured to use) a symbol constellation that corresponds to a DPSK modulation technique—e.g., based on a configured frequency spectrum band, a phase noise, a selected MCS, a received request, etc. Modulation component 310-a may provide N modulation symbols to DFT component 315-a. In some cases, N is determined based on a resource allocation size for (e.g., a number of subcarriers allocated to) a subsequent transmission. DFT component 315-a may convert the N modulation symbols into N frequency-domain symbols. Subcarrier mapping component 320-*a* may map the N frequency-domain symbols to N subcarriers that are allocated to the subsequent transmission. IDFT component 325-*a* may convert the mapped frequency-domain symbols to a time-domain signal (or DPSK SC-FDM symbol) based on M subcarriers being configured for the transmission. The DPSK SC-FDM symbol may include modified versions of the N modulated symbols, arranged serially, and M–N weighted sums of the N modulated symbols interspersed between the N modified modulated symbols. Signal processing component 330-*a* may add a cyclic prefix to the DPSK SC-FDM symbol. Signal processing component 330-*a* may also apply pulse shaping to the DPSK SC-FDM symbol. Transmission component 335-*a* may convert the DPSK SC-FDM symbol from a discretized version to an analog version. Transmission component 335-*a* may also upconvert the DPSK SC-FDM symbol to a carrier frequency and use a power amplifier to generate an RF signal that is applied to a transmit antenna that is coupled with the power amplifier.

Figure 3B:
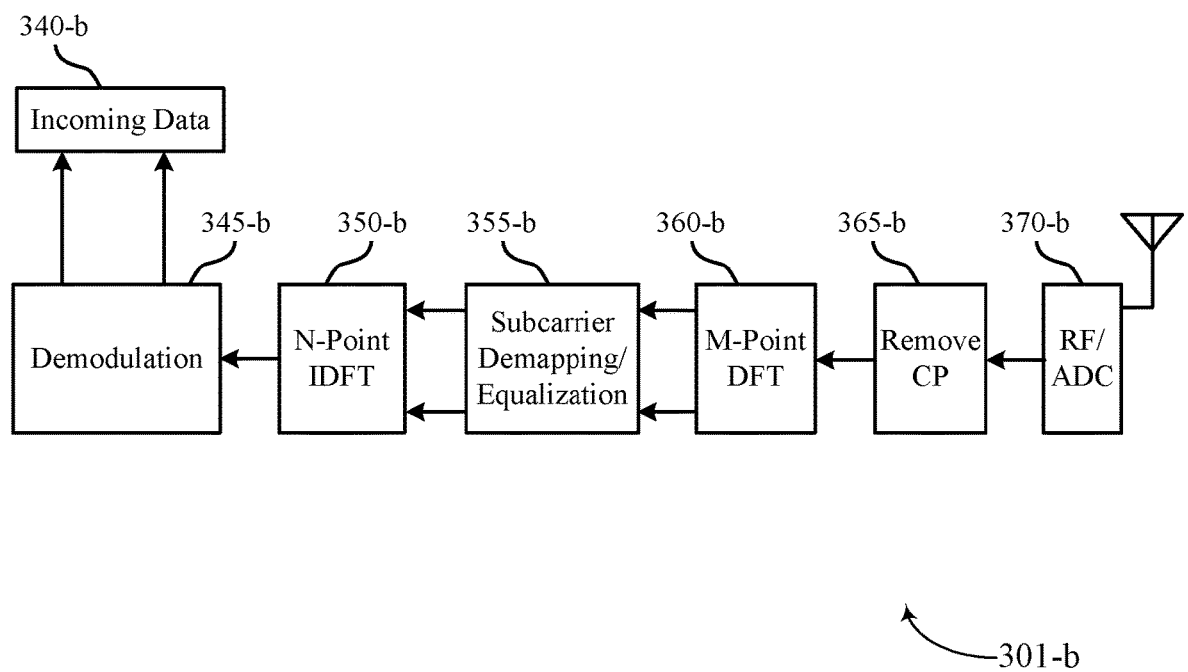

FIG. 3B illustrates aspects of an RF chain for selecting a transmission configuration in accordance with various aspects of the present disclosure.

Reception chain 301-*b* may be configured to receive an SC-FDMA transmission that conveys a set of data. Reception chain 301-*b* may include demodulation component 345-*b*, IDFT component 350-*b*, subcarrier demapping component 355-*b*, DFT component 360-*b*, signal processing component 365-*b*, and reception component 370-*b*.

Reception component 370-*b* may be configured to convert a time-domain signal from an analog version to a digitized version of the time-domain signal—e.g., the reception component 370-*b* may sample the time-domain signal. Reception component 370-*b* may include mixers that are used to remove a carrier frequency from the time-domain signal. Reception component 370-*b* may be coupled with an RF antenna that is used to wirelessly receive the analog time-domain signal over a channel. The time-domain signal may include a set of modulated symbols that are arranged in a serial fashion as well as summations of the set of modulated symbols that are interspersed between the set of modulated symbols.

Signal processing component 365-*b* may be configured to remove a cyclic prefix from the digitized time-domain signal. Signal processing component 365-*b* may be configured to provide the set of modulated symbols and the summations of the set of modulated symbols included in the time-domain signal to DFT component 360-*b* in a parallel fashion.

DFT component 360-*b* may be configured to generate a set of frequency-domain symbols from the set of modulated symbols and summations included in the time-domain signal. DFT component 360-*b* may be an M-Point DFT and may generate M frequency-domain symbols that correspond to a set of subcarriers. The set of subcarriers may include M subcarriers that make up a carrier.

Subcarrier demapping component 355-*b* may be configured to demap the set of frequency-domain symbols from the set of subcarriers. In some cases, subcarrier demapping component 355-*b* may be configured to extract N frequency-domain symbols from N subcarriers that were allocated to the transmission. In some examples, the number of subcarriers available for mapping may be based on a number of communication resources (e.g., a number of resource blocks) allocated to the transmission.

IDFT component 350-*b* may be configured to generate a time-domain signal from the set of frequency-domain signals. IDFT component 350-*b* may be configured to generate the time-domain signal based on a number of subcarriers allocated to the transmission. The time-domain signal may include a set of modulated symbols that were originally processed by a transmitting device (e.g., at modulation component 310-*a*). IDFT component 350-*b* may be configured to provide the set of modulated symbols to demodulation component 345-*b* in a serial fashion.

Demodulation component 345-*b* may be configured to map the set of modulated symbols (e.g., 1 or more bits of data) to modulation symbols of a modulation constellation corresponding to a configured modulation technique (e.g., a non-coherent or coherent modulation technique). In some examples, demodulation component 345-*b* may be configured to use a non-coherent demodulation technique, such as DPSK or DAPSK. In other examples, demodulation component 345-*b* may be configured to use coherent demodulation techniques, such as PSK or QAM. Demodulation component 345-*b* may also be configured to detect a data value associated with the set of modulated symbols based on mapping the set of modulated symbols to the modulation constellation. In some examples, demodulation component 345-*b* outputs set of data 340-*b* (e.g., a set of bits, such as "01010001001").

Figure 4:
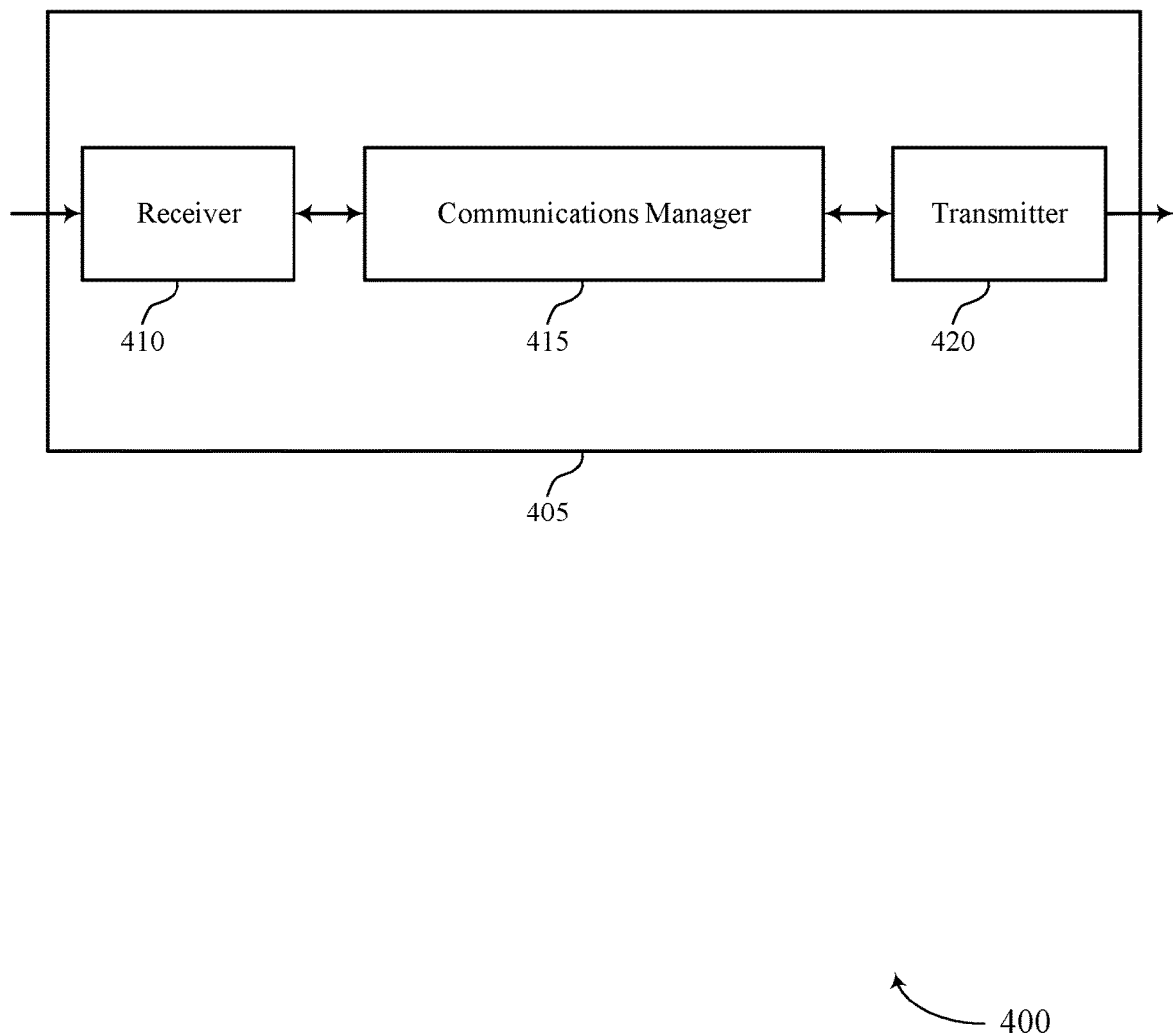
FIGS. 4 and 5 show block diagrams of devices that support selecting a transmission configuration in accordance with aspects of the present disclosure.

FIG. 4 shows a block diagram 400 of a device 405 that supports selecting a transmission configuration in accordance with aspects of the present disclosure. The device 405 may be an example of aspects of a UE 115 as described herein. Alternatively, the device 405 may be an example of aspects of a base station 105 as described herein. The device 405 may include a receiver 410, a communications manager 415, and a transmitter 420. The device 405 may also include one or more processors, memory coupled with the one or more processors, and instructions stored in the memory that are executable by the one or more processors to enable the one or more processors to perform the transmission configuration selection features discussed herein. Each of these components may be in communication with one another (e.g., via one or more buses).

The receiver 410 may receive information such as packets, user data, or control information associated with various information channels (e.g., control channels, data channels, and information related to selecting a transmission configuration, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may select, from a group of modulation configurations, a non-coherent modulation configuration based on a radio frequency spectrum band used by the transmitting device to communicate with a receiving device, modulate, based on the non-coherent modulation configuration, a set of data using a DPSK modulation to obtain a set of modulated symbols, generate a set of frequency-domain symbols from the set of modulated symbols using a discrete Fourier transform, and transmit, in a symbol period of the radio frequency spectrum band, a time-domain waveform obtained from the set of frequency-domain symbols. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
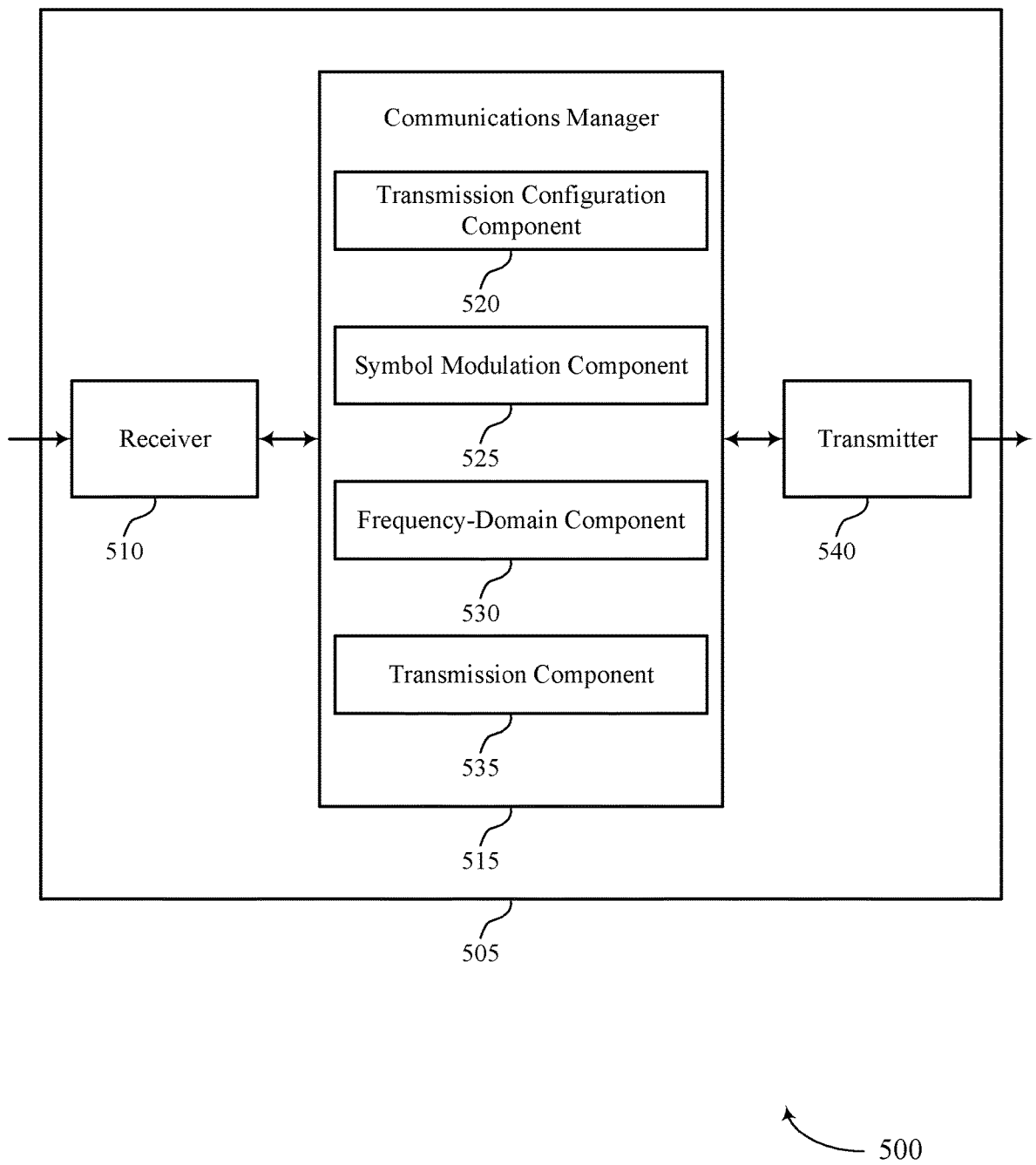

FIG. 5 shows a block diagram 500 of a device 505 that supports selecting a transmission configuration in accordance with aspects of the present disclosure. The device 505 may be an example of aspects of a device 405, or a UE 115 as described herein. Alternatively, the device 505 may be an example of aspects of a base station 105 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to selecting a transmission configuration, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a transmission configuration component 520, a symbol modulation component 525, a frequency-domain component 530, and a transmission component 535. The communications manager 515 may be an example of aspects of the communications manager 710 described herein.

The transmission configuration component 520 may select, from a group of modulation configurations, a non-coherent modulation configuration based on a radio frequency spectrum band used by the transmitting device to communicate with a receiving device.

The symbol modulation component 525 may modulate, based on the non-coherent modulation configuration, a set of data using a DPSK modulation to obtain a set of modulated symbols.

The frequency-domain component 530 may generate a set of frequency-domain symbols from the set of modulated symbols using a discrete Fourier transform.

The transmission component 535 may transmit, in a symbol period of the radio frequency spectrum band, a time-domain waveform obtained from the set of frequency-domain symbols.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

In some cases, the transmission configuration component 520, the symbol modulation component 525, the frequency-domain component 530, and the transmission component 535 may each be, or be at least a part of, a processor (e.g., a transceiver processor, or a radio processor, or a transmitter processor, or a receiver processor). The processor may be coupled with memory and execute instructions stored in the memory that enable the processor to perform or facilitate the features of the transmission configuration component 520, the symbol modulation component 525, the frequency-domain component 530, and the transmission component 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
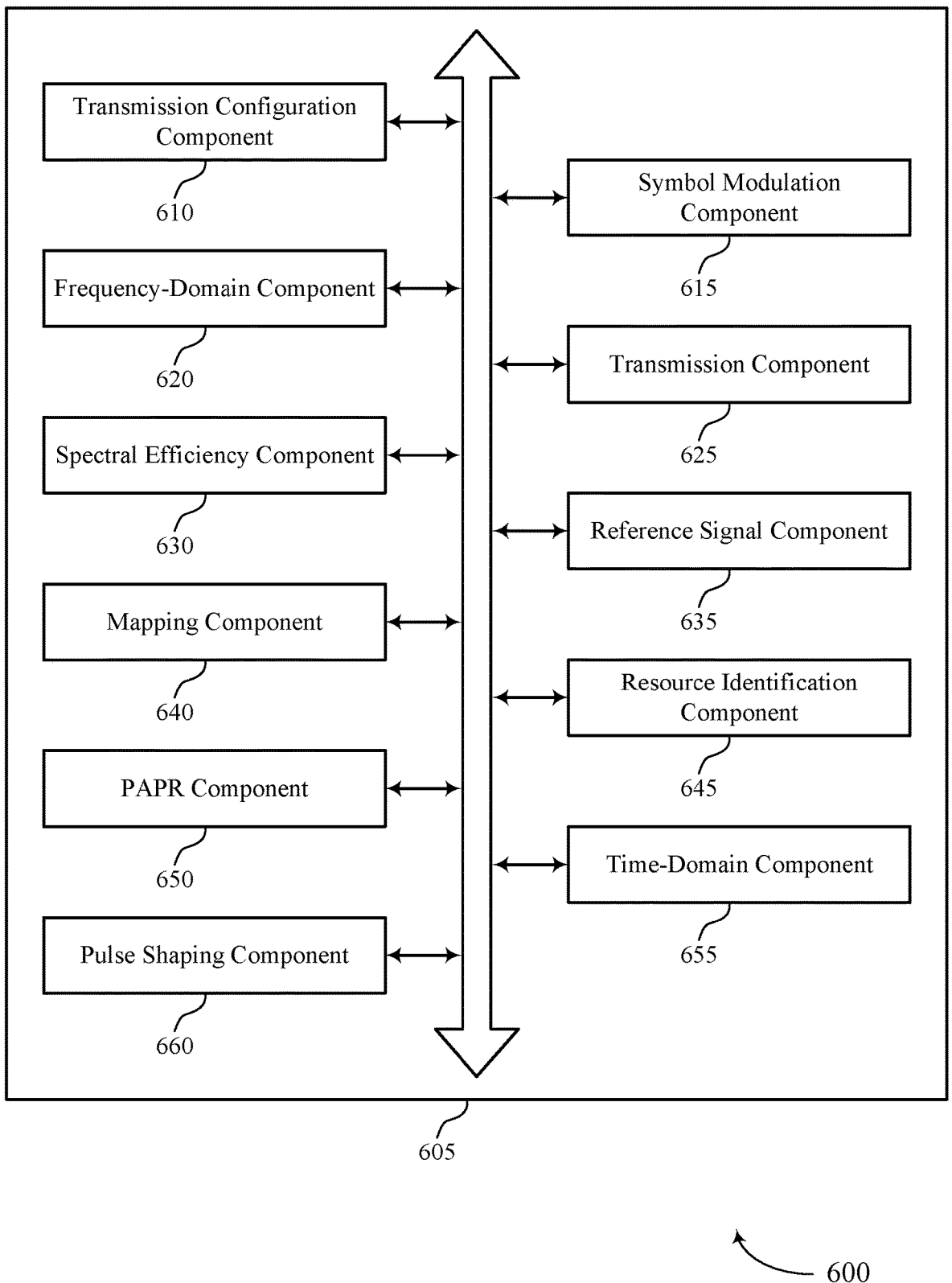
FIG. 6 shows a block diagram of a communications manager that supports selecting a transmission configuration in accordance with aspects of the present disclosure.

FIG. 6 shows a block diagram 600 of a communications manager 605 that supports selecting a transmission configuration in accordance with aspects of the present disclosure. The communications manager 605 may be an example of aspects of a communications manager 415, a communications manager 515, or a communications manager 710 described herein. The communications manager 605 may include a transmission configuration component 610, a symbol modulation component 615, a frequency-domain component 620, a transmission component 625, a spectral efficiency component 630, a reference signal component 635, a mapping component 640, a resource identification component 645, a PAPR component 650, a time-domain component 655, and a pulse shaping component 660. Each of these modules may communicate, directly or indirectly, with one another (e.g., via one or more buses).

The transmission configuration component 610 may select, from a group of modulation configurations, a non-coherent modulation configuration based on a radio frequency spectrum band used by the transmitting device to communicate with a receiving device.

In some examples, the transmission configuration component 610 may transmit, to the receiving device, an indication that a non-coherent single-carrier frequency-domain multiple access (SC-FDMA) mode has been selected based on the non-coherent modulation configuration being selected.

In some examples, the transmission configuration component 610 may receive, from the receiving device, a request for the non-coherent modulation configuration to be configured, where the non-coherent modulation configuration is selected based on the request.

In some examples, the transmission configuration component 610 may identify a phase noise associated with transmitting the set of data over the radio frequency spectrum band, where the non-coherent modulation configuration is selected based on the phase noise exceeding a threshold.

In some examples, identifying that the radio frequency spectrum band includes a millimeter wave spectrum band, a sub-Terahertz frequency spectrum band, or both, where the non-coherent modulation configuration is selected based on the set of data being scheduled for transmission over the millimeter wave spectrum band or the sub-Terahertz frequency spectrum band.

In some examples, the transmission configuration component 610 may identify a modulation and coding scheme for transmitting the set of data over the radio frequency spectrum band, where the non-coherent modulation configuration is further selected based on the modulation and coding scheme exceeding a threshold.

In some examples, the transmission configuration component 610 may select a DAPSK constellation based on the spectral efficiency associated with the set of DPSK constellations being below a threshold, where the set of data is modulated in accordance with the DAPSK constellation.

In some examples, the transmission configuration component 610 may select, from a group of channel access modes, a single-carrier frequency-domain multiple access (SC-FDMA) mode based on the radio frequency spectrum band, where the set of frequency-domain symbols are generated using the discrete Fourier transform based on the SC-FDMA mode being selected.

In some examples, the transmission configuration component 610 may select a MIMO SC-FDMA mode based on the spectral efficiency associated with the SC-FDMA mode being below a threshold, where the set of frequency-domain symbols are generated using the discrete Fourier transform based on the MIMO SC-FDMA mode.

In some examples, the transmission configuration component 610 may select a DPSK constellation based on a PAPR associated with communicating over the radio frequency spectrum band using the SC-FDMA mode and the DPSK constellation, where the PAPR associated with the DPSK constellation is based on a relationship between the amount of resources allocated to the transmitting device and the carrier bandwidth, and where the set of data is modulated in accordance with the DPSK constellation.

In some examples, determining that an entry of a table that corresponds to the amount of resources and the carrier bandwidth includes an indication of the DPSK constellation.

In some examples, the transmission configuration component 610 may select from the group of modulation configurations, a coherent modulation configuration based on the radio frequency spectrum band, a modulation and coding scheme, a phase noise, or a combination thereof.

In some examples, the transmission configuration component 610 may select from a group of channel access modes for communicating over the radio frequency spectrum band, a single-carrier frequency-domain multiple access (SC-FDMA) mode based on the radio frequency spectrum band, the modulation and coding scheme, the phase noise, or a combination thereof.

In some examples, the transmission configuration component 610 may increase an order for the PSK modulation based on the PAPR threshold, where a PAPR of the second time-domain waveform satisfies the PAPR threshold based on the order for the PSK modulation being increased.

In some cases, the indication is transmitted in a control channel using a coherent multiple-carrier OFDMA mode.

In some cases, the group of channel access modes includes single-carrier channel access modes and multiple-carrier channel access modes.

In some cases, the second set of data being scheduled for transmission over a sub-millimeter wave spectrum band, the modulation and coding scheme for transmitting the second set of data over the radio frequency spectrum band being below a first threshold, the phase noise associated with transmitting the second set of data over the radio frequency spectrum band being below a second threshold, or a combination thereof.

In some cases, the group of modulation configurations includes one or more coherent modulation configurations and one or more non-coherent modulation configurations.

In some cases, the DPSK modulation includes a differential M-ary phase shift keying modulation or a differential amplitude M-ary phase shift keying modulation.

The symbol modulation component 615 may modulate, based on the non-coherent modulation configuration, a set of data using a DPSK modulation to obtain a set of modulated symbols.

In some examples, the symbol modulation component 615 may modulate, based on the coherent modulation configuration being selected, a second set of data using a phase shift keying (PSK) modulation configuration to obtain a second set of modulated symbols.

The frequency-domain component 620 may generate a set of frequency-domain symbols from the set of modulated symbols using a discrete Fourier transform.

In some examples, the frequency-domain component 620 may generate a second set of frequency-domain symbols from the second set of modulated symbols using the discrete Fourier transform based on the SC-FDMA mode, where the second time-domain waveform is obtained from the second set of frequency-domain symbols.

The transmission component 625 may transmit, in a symbol period of the radio frequency spectrum band, a time-domain waveform obtained from the set of frequency-domain symbols.

In some examples, the transmission component 625 may transmit, in a second symbol period of the radio frequency spectrum band, a second time-domain waveform based on the second set of modulated symbols.

The spectral efficiency component 630 may identify, for a set of DPSK constellations, a spectral efficiency associated with a communication link between the transmitting device and the receiving device based on the non-coherent modulation configuration being selected.

In some examples, the spectral efficiency component 630 may identify, for the SC-FDMA mode, a spectral efficiency associated with a communication link between the transmitting device and the receiving device.

The reference signal component 635 may disable transmission of phase tracking reference signals based on the non-coherent modulation configuration being selected.

In some examples, the reference signal component 635 may disable transmission of demodulation reference signals based on a delay profile associated with communicating over the radio frequency spectrum band using a non-coherent single-carrier frequency-domain multiple access (SC-FDMA) mode.

The mapping component 640 may map a portion of the set of data to resources allocated for the phase tracking reference signals.

In some examples, the mapping component 640 may map a portion of the set of data to resources allocated for the demodulation reference signals, where a coding rate of the time-domain waveform is reduced based on the mapping.

In some examples, the mapping component 640 may map the second set of frequency-domain symbols to a set of subcarriers in the radio frequency spectrum band.

In some examples, the mapping component 640 may map the second set of modulated symbols to a set of subcarriers in the radio frequency spectrum band.

In some cases, a coding rate of the time-domain waveform is reduced based on the mapping.

The resource identification component 645 may identify an amount of resources allocated to the transmitting device and a carrier bandwidth configured for the transmitting device.

The PAPR component 650 may identify a peak-to-average power (PAPR) threshold for communicating over the radio frequency spectrum band.

In some examples, the PAPR component 650 may identify a first PAPR associated with communicating over the radio frequency spectrum band using the SC-FDMA mode and a first DPSK constellation of a first order.

In some examples, the PAPR component 650 may identify a second PAPR associated with communicating over the radio frequency spectrum band using the SC-FDMA mode and a second DPSK constellation of a second order that is larger than the first order, where the set of data is modulated in accordance with the second DPSK constellation based on the second PAPR being below the PAPR threshold.

In some examples, the PAPR component 650 may identify a peak-to-average power (PAPR) threshold for communicating over the radio frequency spectrum band using the SC-FDMA mode.

The time-domain component 655 may generate a third time-domain waveform from the mapped second set of frequency-domain symbols using an inverse discrete Fourier transform.

In some examples, the time-domain component 655 may generate a third time-domain waveform from the mapped second set of modulated symbols using an inverse discrete Fourier transform.

The pulse shaping component 660 may upsample the third time-domain waveform to obtain the second time-domain waveform.

In some cases, the transmission configuration component 610, the symbol modulation component 615, the frequency-domain component 620, the transmission component 625, the spectral efficiency component 630, the reference signal component 635, the mapping component 640, the resource identification component 645, the PAPR component 650, the time-domain component 655, and the pulse shaping component 660 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the transmission configuration component 610, the symbol modulation component 615, the frequency-domain component 620, the transmission component 625, the spectral efficiency component 630, the reference signal component 635, the mapping component 640, the resource identification component 645, the PAPR component 650, the time-domain component 655, and the pulse shaping component 660 discussed herein.

Figure 7:
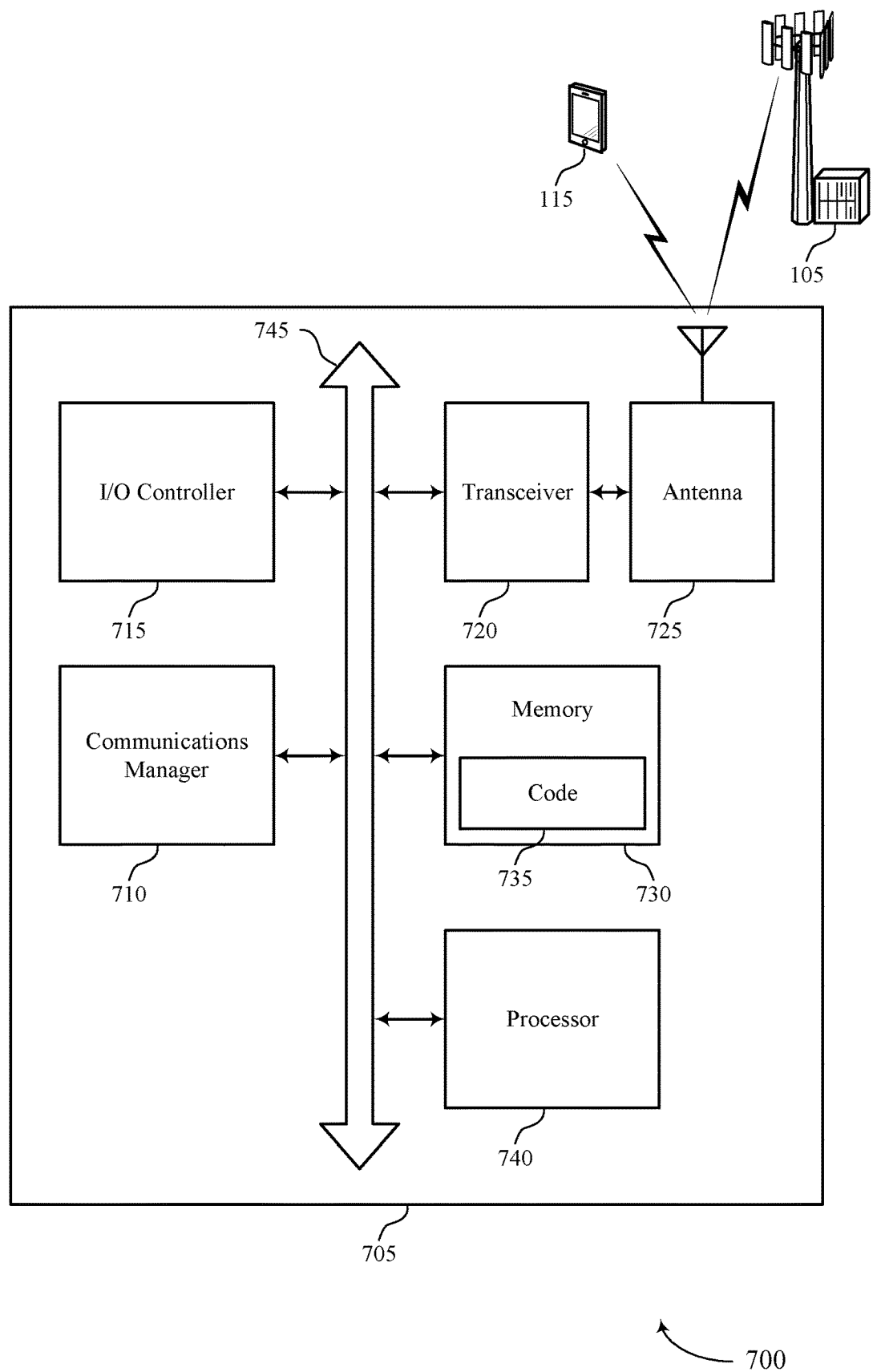
FIG. 7 shows a diagram of a system including a device that supports selecting a transmission configuration in accordance with aspects of the present disclosure.

FIG. 7 shows a diagram of a system 700 including a device 705 that supports selecting a transmission configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may select, from a group of modulation configurations, a non-coherent modulation configuration based on a radio frequency spectrum band used by the transmitting device to communicate with a receiving device, modulate, based on the non-coherent modulation configuration, a set of data using a DPSK modulation to obtain a set of modulated symbols, generate a set of frequency-domain symbols from the set of modulated symbols using a discrete Fourier transform, and transmit, in a symbol period of the radio frequency spectrum band, a time-domain waveform obtained from the set of frequency-domain symbols.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM), read-only memory (ROM), or a combination thereof. The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting selecting a transmission configuration).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
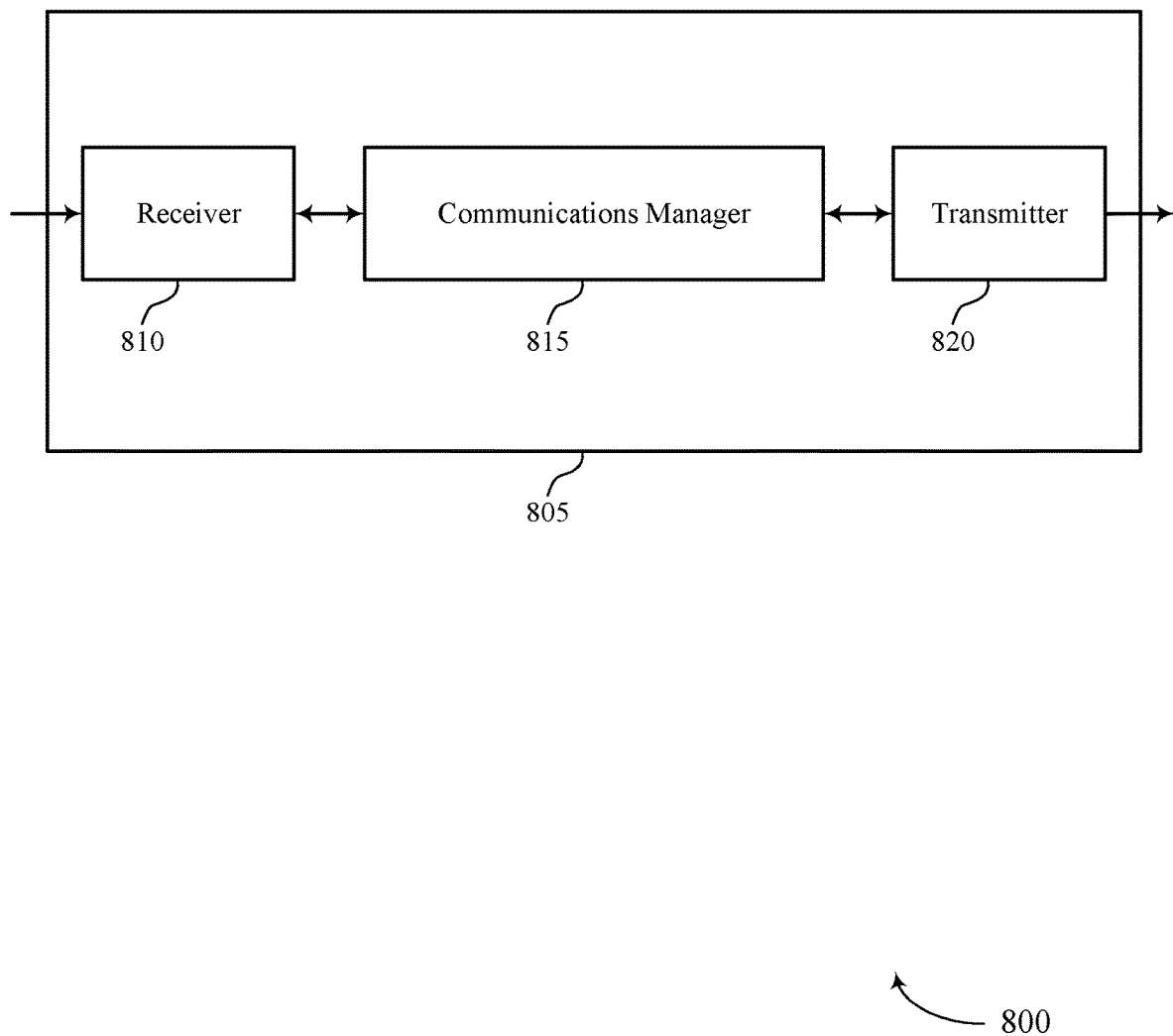
FIGS. 8 and 9 show block diagrams of devices that support selecting a transmission configuration in accordance with aspects of the present disclosure.

FIG. 8 shows a block diagram 800 of a device 805 that supports selecting a transmission configuration in accordance with aspects of the present disclosure. The device 805 may be an example of aspects of a base station 105 as described herein. Alternatively, the device 805 may be an example of aspects of a UE 115 as described herein. The device 805 may include a receiver 810, a communications manager 815, and a transmitter 820. The device 805 may also include one or more processors, memory coupled with the one or more processors, and instructions stored in the memory that are executable by the one or more processors to enable the one or more processors to perform the transmission configuration selection features discussed herein. Each of these components may be in communication with each other (e.g., via one or more buses). Each of these components may be in communication with one another (e.g., via one or more buses).

The receiver 810 may receive information such as packets, user data, or control information associated with various information channels (e.g., control channels, data channels, and information related to selecting a transmission configuration, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may select, from a group of modulation configurations, a non-coherent modulation configuration based on a radio frequency spectrum band used by the receiving device to communicate with a transmitting device, receive, in a symbol period of the radio frequency spectrum band, a time-domain waveform, generate a set of frequency-domain symbols from the time-domain waveform using a discrete Fourier transform, demap the set of frequency-domain symbols from a set of subcarriers in the radio frequency spectrum band, generate a set of modulated symbols from the demapped set of frequency-domain symbols using an inverse discrete Fourier transform, and demodulate, based on the non-coherent modulation configuration, the set of modulated symbols using a DPSK demodulation to obtain a set of data. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
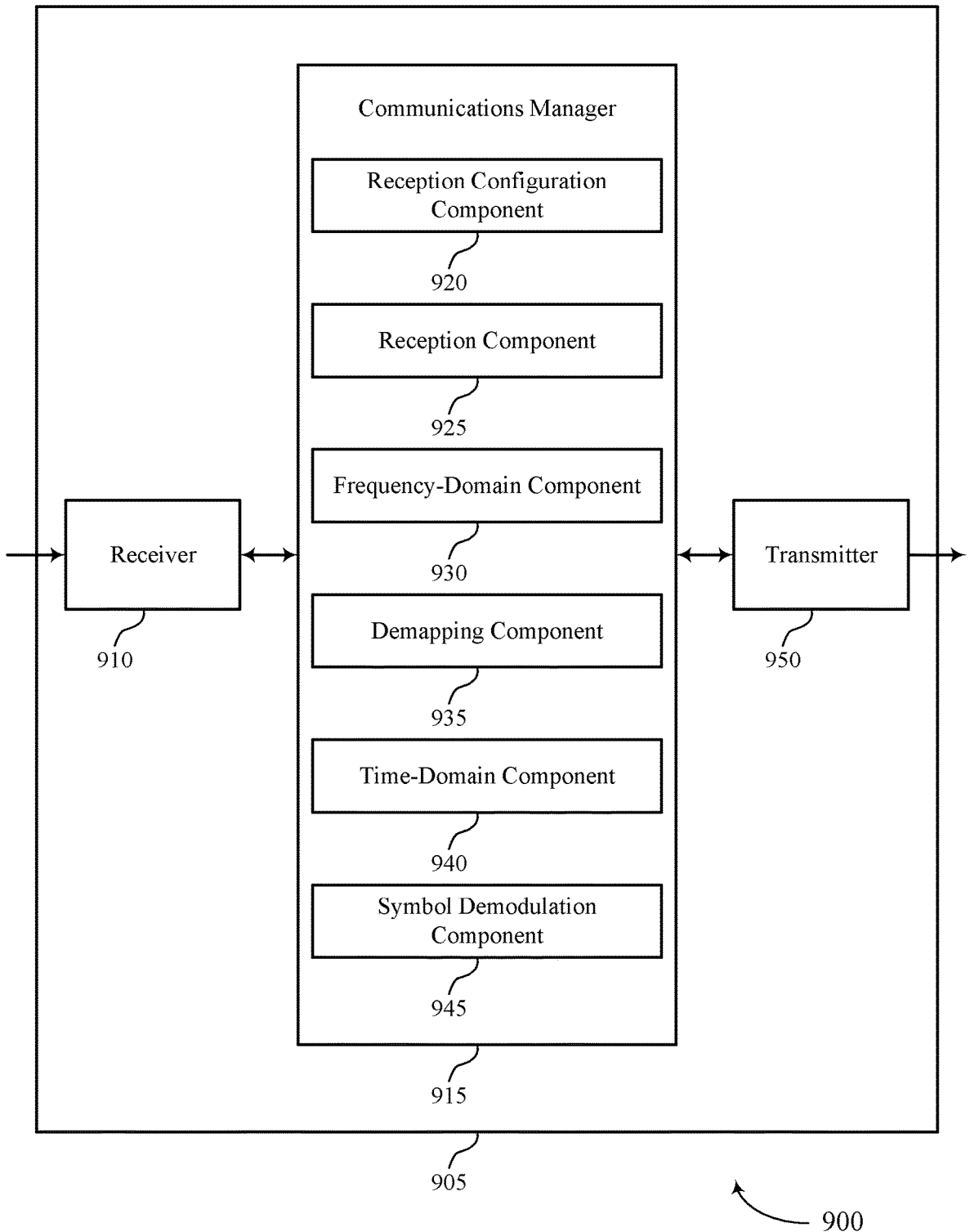

FIG. 9 shows a block diagram 900 of a device 905 that supports selecting a transmission configuration in accordance with aspects of the present disclosure. The device 905 may be an example of aspects of a device 805, or a base station 105 as described herein. Alternatively, the device 905 may be an example of aspects of a UE 115 as described herein. The device 905 may include a receiver 910, a communications manager 915, and a transmitter 950. The device 905 may also include a processor. Each of these components may be in communication with one another (e.g., via one or more buses).

The receiver 910 may receive information such as packets, user data, or control information associated with various information channels (e.g., control channels, data channels, and information related to selecting a transmission configuration, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a reception configuration component 920, a reception component 925, a frequency-domain component 930, a demapping component 935, a time-domain component 940, and a symbol demodulation component 945. The communications manager 915 may be an example of aspects of the communications manager 1110 described herein.

The reception configuration component 920 may select, from a group of modulation configurations, a non-coherent modulation configuration based on a radio frequency spectrum band used by the receiving device to communicate with a transmitting device.

The reception component 925 may receive, in a symbol period of the radio frequency spectrum band, a time-domain waveform.

The frequency-domain component 930 may generate a set of frequency-domain symbols from the time-domain waveform using a discrete Fourier transform.

The demapping component 935 may demap the set of frequency-domain symbols from a set of subcarriers in the radio frequency spectrum band.

The time-domain component 940 may generate a set of modulated symbols from the demapped set of frequency-domain symbols using an inverse discrete Fourier transform.

The symbol demodulation component 945 may demodulate, based on the non-coherent modulation configuration, the set of modulated symbols using a DPSK demodulation to obtain a set of data.

The transmitter 950 may transmit signals generated by other components of the device 905. In some examples, the transmitter 950 may be collocated with a receiver 910 in a transceiver module. For example, the transmitter 950 may be an example of aspects of the transceiver 1120 described with reference to FIG. 11. The transmitter 950 may utilize a single antenna or a set of antennas.

In some cases, the reception configuration component 920, the reception component 925, the frequency-domain component 930, the demapping component 935, the time-domain component 940, and the symbol demodulation component 945 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reception configuration component 920, the reception component 925, the frequency-domain component 930, the demapping component 935, the time-domain component 940, and the symbol demodulation component 945 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
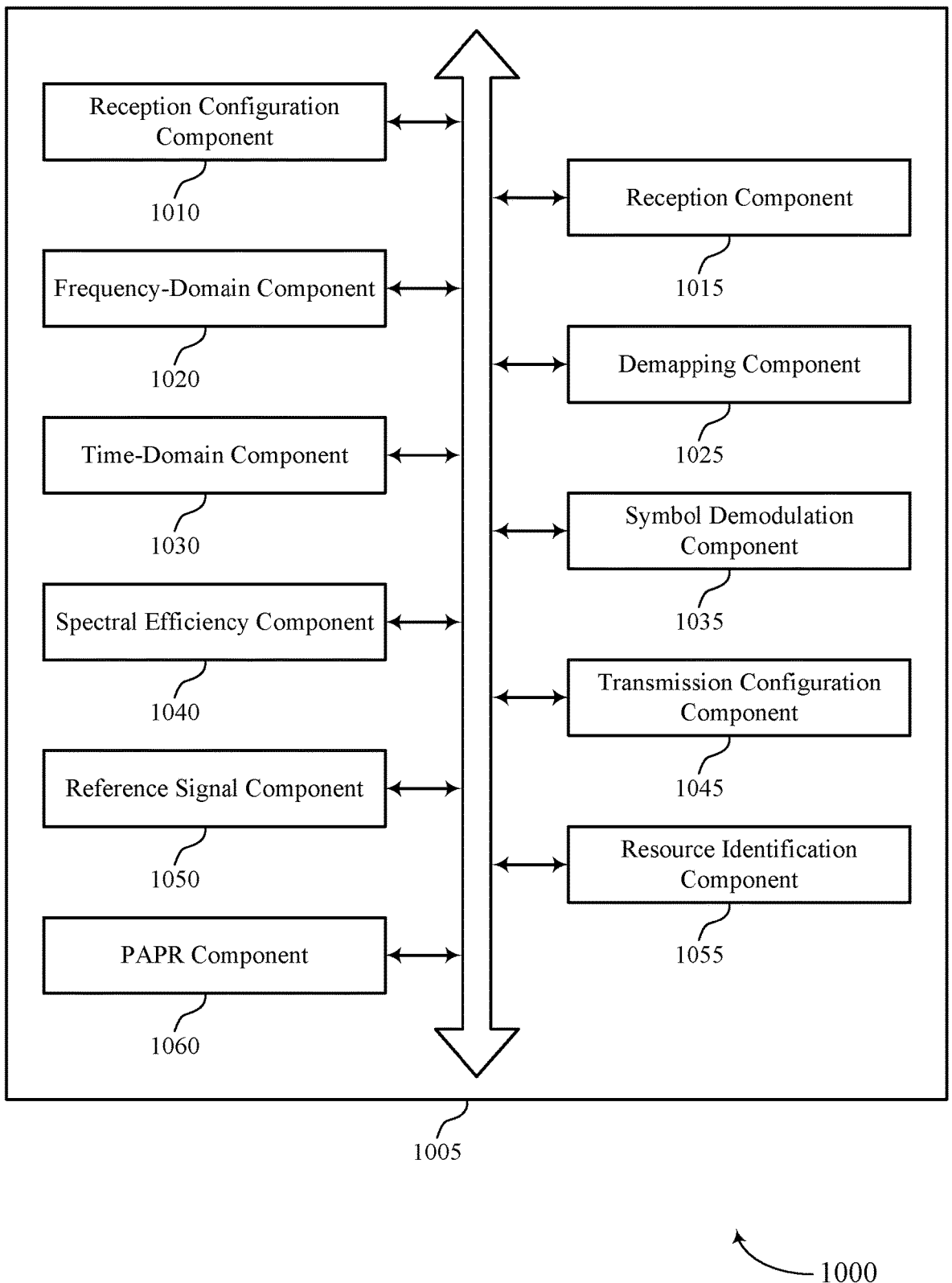
FIG. 10 shows a block diagram of a communications manager that supports selecting a transmission configuration in accordance with aspects of the present disclosure.

FIG. 10 shows a block diagram 1000 of a communications manager 1005 that supports selecting a transmission configuration in accordance with aspects of the present disclosure. The communications manager 1005 may be an example of aspects of a communications manager 815, a communications manager 915, or a communications manager 1110 described herein. The communications manager 1005 may include a reception configuration component 1010, a reception component 1015, a frequency-domain component 1020, a demapping component 1025, a time-domain component 1030, a symbol demodulation component 1035, a spectral efficiency component 1040, a transmission configuration component 1045, a reference signal component 1050, a resource identification component 1055, and a PAPR component 1060. Each of these modules may communicate, directly or indirectly, with one another (e.g., via one or more buses).

The reception configuration component 1010 may select, from a group of modulation configurations, a non-coherent modulation configuration based on a radio frequency spectrum band used by the receiving device to communicate with a transmitting device.

In some examples, the reception configuration component 1010 may receive, from the receiving device, an indication that a non-coherent single-carrier frequency-domain multiple access (SC-FDMA) mode has been selected for transmitting the set of data.

In some examples, the reception configuration component 1010 may transmit, to the transmitting device, a request for the non-coherent modulation configuration to be configured based on selecting the non-coherent modulation configuration.

In some examples, the reception configuration component 1010 may identify a phase noise associated with transmitting the set of data over the radio frequency spectrum band, where the non-coherent modulation configuration is selected based on the phase noise exceeding a threshold.

In some examples, identifying that the radio frequency spectrum band includes a millimeter wave spectrum band, a sub-Terahertz frequency spectrum band, or both, where the non-coherent modulation configuration is selected based on the set of data being scheduled for transmission over the millimeter wave spectrum band or the sub-Terahertz frequency spectrum band.

In some examples, the reception configuration component 1010 may identify a modulation and coding scheme for transmitting the set of data over the radio frequency spectrum band, where the non-coherent modulation configuration is further selected based on the modulation and coding scheme exceeding a threshold.

In some examples, the reception configuration component 1010 may select, from a group of channel access modes, a single-carrier frequency-domain multiple access (SC-FDMA) mode based on the radio frequency spectrum band, where the set of frequency-domain symbols are generated using the discrete Fourier transform based on the SC-FDMA mode being selected.

In some examples, the reception configuration component 1010 may select a MIMO SC-FDMA mode based on the spectral efficiency associated with the SC-FDMA mode being below a threshold, where the set of frequency-domain symbols are generated using the discrete Fourier transform based on the MIMO SC-FDMA mode.

In some examples, the reception configuration component 1010 may select a DPSK constellation based on a PAPR associated with communicating over the radio frequency spectrum band using the SC-FDMA mode and the DPSK constellation, where the PAPR associated with the DPSK constellation is based on a relationship between the amount of resources allocated to the transmitting device and the carrier bandwidth, and where the set of data is demodulated in accordance with the DPSK constellation.

In some examples, determining that an entry of a table that corresponds to the amount of resources and the carrier bandwidth includes an indication of the DPSK constellation.

In some cases, the indication is received in a control channel using a coherent multiple-carrier OFDMA mode.

In some cases, the group of channel access modes includes single-carrier channel access modes and multiple-carrier channel access modes.

The reception component 1015 may receive, in a symbol period of the radio frequency spectrum band, a time-domain waveform.

In some examples, the reception component 1015 may receive a portion of the set of data over resources allocated for the phase tracking reference signals.

In some examples, the reception component 1015 may receive a portion of the set of data over resources allocated for the demodulation reference signals.

The frequency-domain component 1020 may generate a set of frequency-domain symbols from the time-domain waveform using a discrete Fourier transform.

The demapping component 1025 may demap the set of frequency-domain symbols from a set of subcarriers in the radio frequency spectrum band.

The time-domain component 1030 may generate a set of modulated symbols from the demapped set of frequency-domain symbols using an inverse discrete Fourier transform.

The symbol demodulation component 1035 may demodulate, based on the non-coherent modulation configuration, the set of modulated symbols using a DPSK demodulation to obtain a set of data.

The spectral efficiency component 1040 may identify, for a set of DPSK constellations, a spectral efficiency associated with a communication link between the receiving device and the transmitting device based on the non-coherent modulation configuration being selected.

In some examples, the spectral efficiency component 1040 may identify, for the SC-FDMA mode, a spectral efficiency associated with a communication link between the transmitting device and the receiving device.

The transmission configuration component 1045 may select a DAPSK constellation based on the spectral efficiency associated with the set of DPSK constellations being below a threshold, where the set of data is demodulated in accordance with the DAPSK constellation.

The reference signal component 1050 may determine that transmission of phase tracking reference signals is disabled based on the non-coherent modulation configuration being selected.

In some examples, the reference signal component 1050 may transmit, to the transmitting device, a request to disable transmission of demodulation reference signals based on a delay profile associated with communicating over the radio frequency spectrum band using a non-coherent single-carrier frequency-domain multiple access (SC-FDMA) mode.

The resource identification component 1055 may identify an amount of resources allocated to the receiving device and a carrier bandwidth configured for the receiving device.

The PAPR component 1060 may identify a peak-to-average power (PAPR) threshold for communicating over the radio frequency spectrum band.

In some examples, the PAPR component 1060 may identify a first PAPR associated with communicating over the radio frequency spectrum band using the SC-FDMA mode and a first DPSK constellation of a first order.

In some examples, the PAPR component 1060 may identify a second PAPR associated with communicating over the radio frequency spectrum band using the SC-FDMA mode and a second DPSK constellation of a second order that is larger than the first order, where the set of data is modulated in accordance with the second DPSK constellation based on the second PAPR being below the PAPR threshold.

In some cases, the reception configuration component 1010, the reception component 1015, the frequency-domain component 1020, the demapping component 1025, the time-domain component 1030, the symbol demodulation component 1035, the spectral efficiency component 1040, the transmission configuration component 1045, the reference signal component 1050, the resource identification component 1055, and the PAPR component 1060 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reception configuration component 1010, the reception component 1015, the frequency-domain component 1020, the demapping component 1025, the time-domain component 1030, the symbol demodulation component 1035, the spectral efficiency component 1040, the transmission configuration component 1045, the reference signal component 1050, the resource identification component 1055, and the PAPR component 1060 discussed herein.

Figure 11:
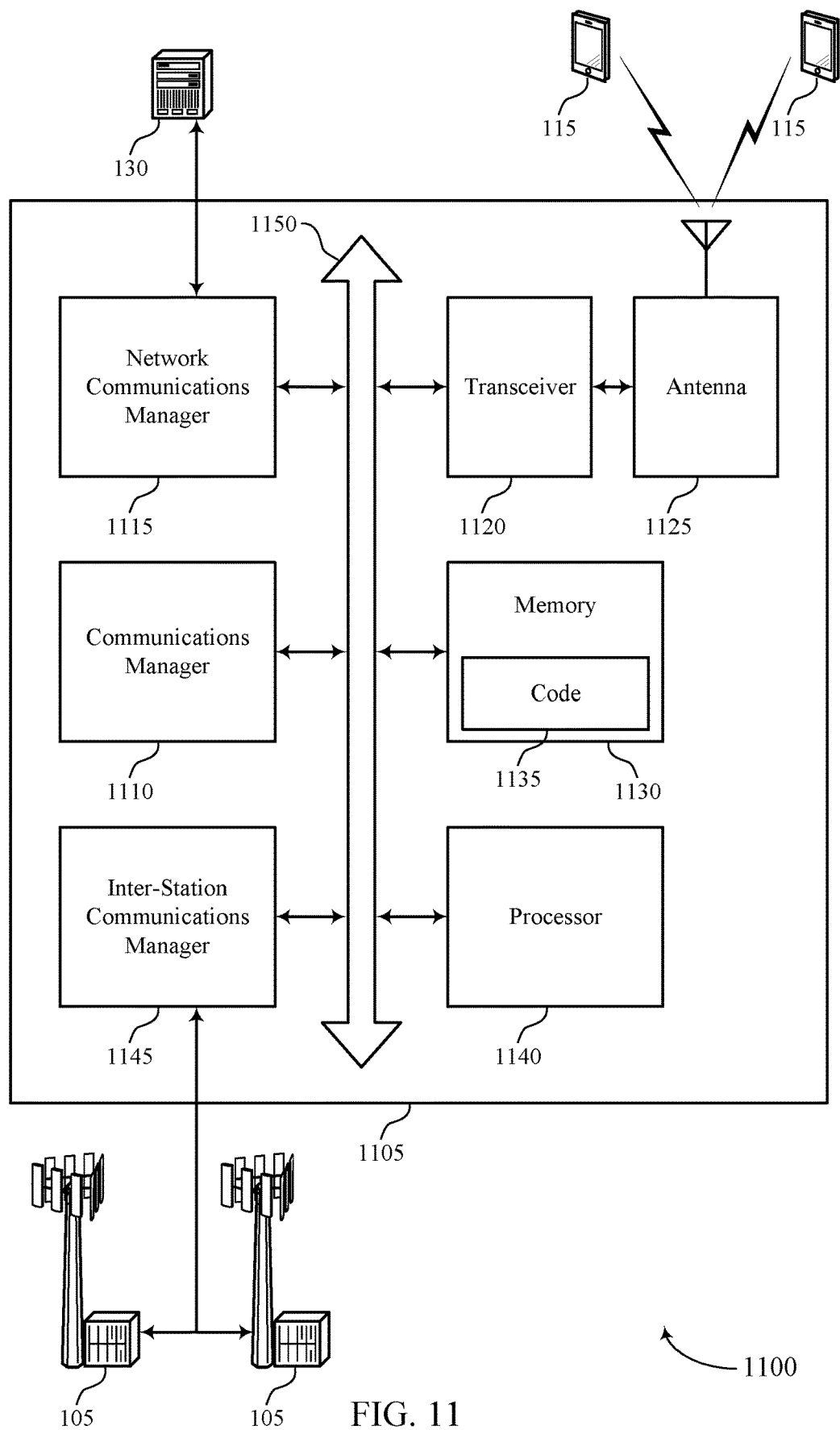
FIG. 11 shows a diagram of a system including a device that supports selecting a transmission configuration in accordance with aspects of the present disclosure.

FIG. 11 shows a diagram of a system 1100 including a device 1105 that supports selecting a transmission configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may select, from a group of modulation configurations, a non-coherent modulation configuration based on a radio frequency spectrum band used by the receiving device to communicate with a transmitting device, receive, in a symbol period of the radio frequency spectrum band, a time-domain waveform, generate a set of frequency-domain symbols from the time-domain waveform using a discrete Fourier transform, demap the set of frequency-domain symbols from a set of subcarriers in the radio frequency spectrum band, generate a set of modulated symbols from the demapped set of frequency-domain symbols using an inverse discrete Fourier transform, and demodulate, based on the non-coherent modulation configuration, the set of modulated symbols using a DPSK demodulation to obtain a set of data.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting selecting a transmission configuration).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
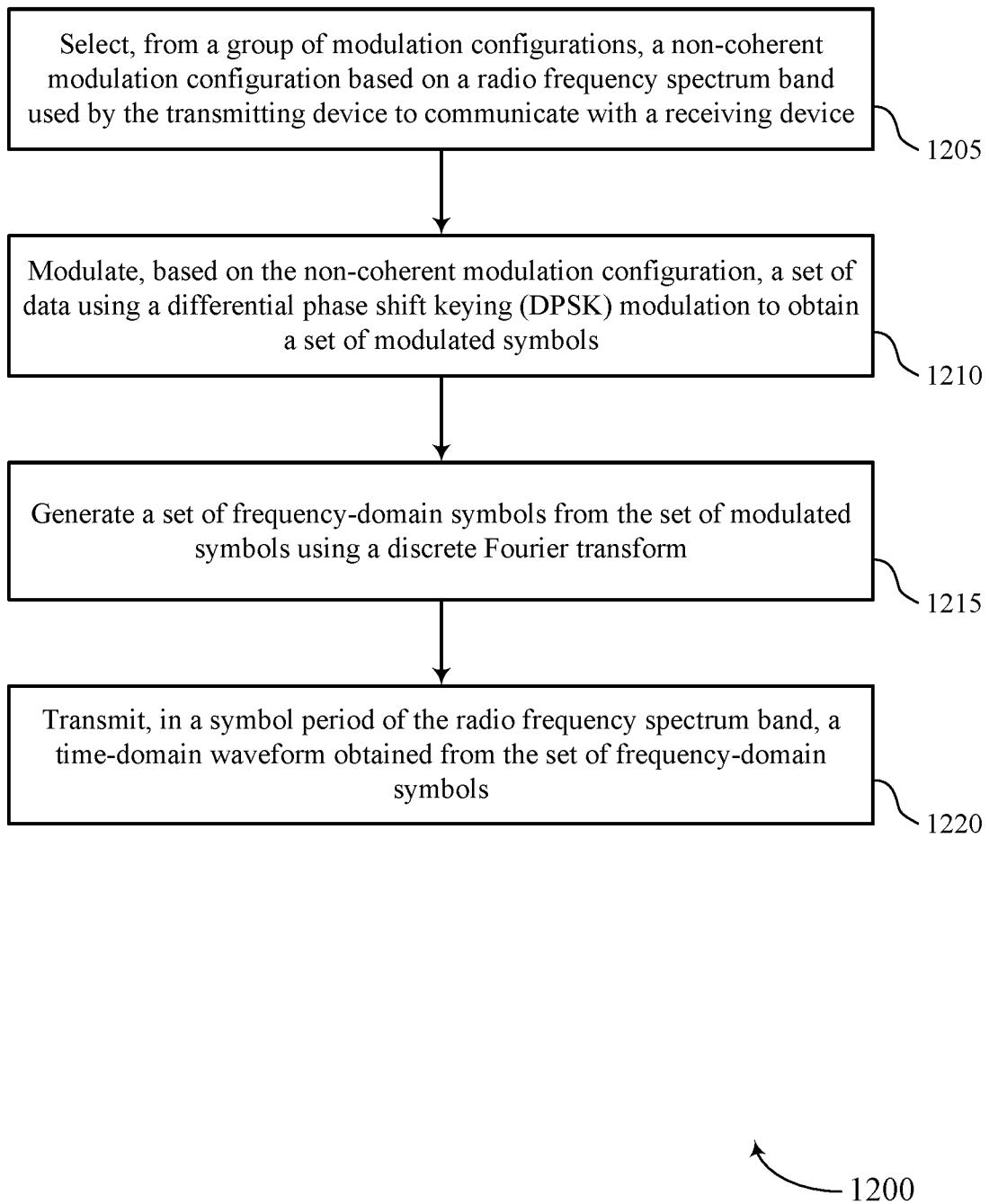
FIGS. 12 and 13 show flowcharts illustrating methods that support selecting a transmission configuration in accordance with aspects of the present disclosure.

FIG. 12 shows a flowchart illustrating a method 1200 that supports selecting a transmission configuration in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may select, from a group of modulation configurations, a non-coherent modulation configuration based on a radio frequency spectrum band used by the transmitting device to communicate with a receiving device. The operations of 1205 may be performed according to the methods described herein. In some examples, aspects of the operations of 1205 may be performed by a transmission configuration component as described with reference to FIGS. 4 through 7.

At 1210, the UE may modulate, based on the non-coherent modulation configuration, a set of data using a DPSK modulation to obtain a set of modulated symbols. The operations of 1210 may be performed according to the methods described herein. In some examples, aspects of the operations of 1210 may be performed by a symbol modulation component as described with reference to FIGS. 4 through 7.

At 1215, the UE may generate a set of frequency-domain symbols from the set of modulated symbols using a discrete Fourier transform. The operations of 1215 may be performed according to the methods described herein. In some examples, aspects of the operations of 1215 may be performed by a frequency-domain component as described with reference to FIGS. 4 through 7.

At 1220, the UE may transmit, in a symbol period of the radio frequency spectrum band, a time-domain waveform obtained from the set of frequency-domain symbols. The operations of 1220 may be performed according to the methods described herein. In some examples, aspects of the operations of 1220 may be performed by a transmission component as described with reference to FIGS. 4 through 7.

Figure 13:
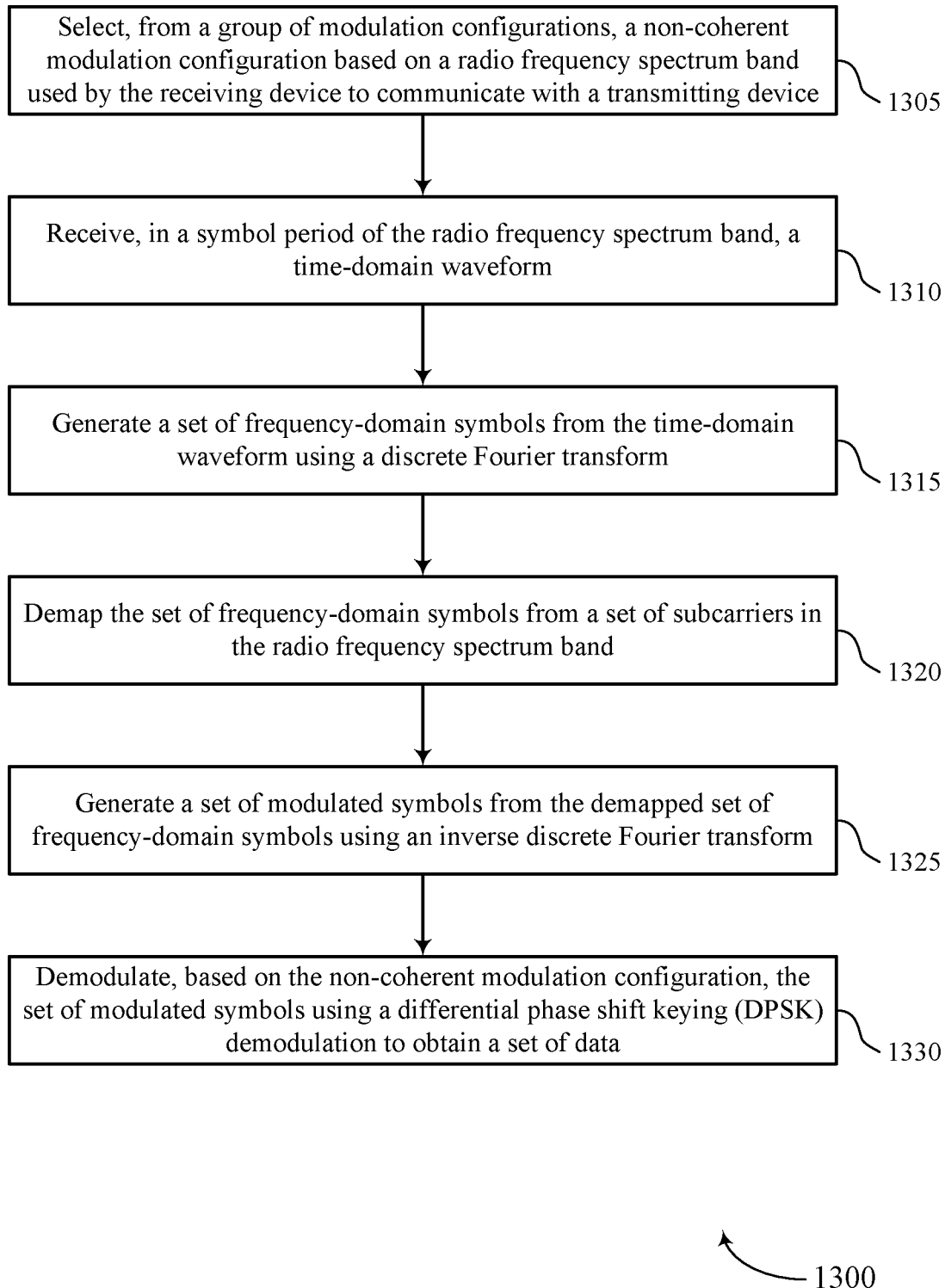

FIG. 13 shows a flowchart illustrating a method 1300 that supports selecting a transmission configuration in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1305, the base station may select, from a group of modulation configurations, a non-coherent modulation configuration based on a radio frequency spectrum band used by the receiving device to communicate with a transmitting device. The operations of 1305 may be performed according to the methods described herein. In some examples, aspects of the operations of 1305 may be performed by a reception configuration component as described with reference to FIGS. 8 through 11.

At 1310, the base station may receive, in a symbol period of the radio frequency spectrum band, a time-domain waveform. The operations of 1310 may be performed according to the methods described herein. In some examples, aspects of the operations of 1310 may be performed by a reception component as described with reference to FIGS. 8 through 11.

At 1315, the base station may generate a set of frequency-domain symbols from the time-domain waveform using a discrete Fourier transform. The operations of 1315 may be performed according to the methods described herein. In some examples, aspects of the operations of 1315 may be performed by a frequency-domain component as described with reference to FIGS. 8 through 11.

At 1320, the base station may demap the set of frequency-domain symbols from a set of subcarriers in the radio frequency spectrum band. The operations of 1320 may be performed according to the methods described herein. In some examples, aspects of the operations of 1320 may be performed by a demapping component as described with reference to FIGS. 8 through 11.

At 1325, the base station may generate a set of modulated symbols from the demapped set of frequency-domain symbols using an inverse discrete Fourier transform. The operations of 1325 may be performed according to the methods described herein. In some examples, aspects of the operations of 1325 may be performed by a time-domain component as described with reference to FIGS. 8 through 11.

At 1330, the base station may demodulate, based on the non-coherent modulation configuration, the set of modulated symbols using a DPSK demodulation to obtain a set of data. The operations of 1330 may be performed according to the methods described herein. In some examples, aspects of the operations of 1330 may be performed by a symbol demodulation component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a transmitting device, comprising: selecting, from a group of modulation configurations, a non-coherent modulation configuration based at least in part on a radio frequency spectrum band used by the transmitting device to communicate with a receiving device; modulating, based at least in part on the non-coherent modulation configuration, a set of data using a differential phase shift keying (DPSK) modulation to obtain a set of modulated symbols; generating a set of frequency-domain symbols from the set of modulated symbols using a discrete Fourier transform; and transmitting, in a symbol period of the radio frequency spectrum band, a time-domain waveform obtained from the set of frequency-domain symbols.

Aspect 2: The method of aspect 1, further comprising: transmitting, to the receiving device, an indication that a non-coherent single-carrier frequency-domain multiple access (SC-FDMA) mode has been selected based at least in part on the non-coherent modulation configuration being selected.

Aspect 3: The method of aspect 2, wherein the indication is transmitted in a control channel using a coherent multiple-carrier orthogonal frequency-domain multiple access (OFDMA) mode.

Aspect 4: The method of any of aspects 1 through 3, further comprising: receiving, from the receiving device, a request for the non-coherent modulation configuration to be configured, wherein the non-coherent modulation configuration is selected based at least in part on the request.

Aspect 5: The method of any of aspects 1 through 4, further comprising: identifying a phase noise associated with transmitting the set of data over the radio frequency spectrum band, wherein the non-coherent modulation configuration is selected based at least in part on the phase noise exceeding a threshold.

Aspect 6: The method of any of aspects 1 through 5, further comprising: identifying that the radio frequency spectrum band comprises a millimeter wave spectrum band, a sub-Terahertz frequency spectrum band, or both, wherein the non-coherent modulation configuration is selected based at least in part on the set of data being scheduled for transmission over the millimeter wave spectrum band or the sub-Terahertz frequency spectrum band.

Aspect 7: The method of aspect 6, further comprising: identifying a modulation and coding scheme for transmitting the set of data over the radio frequency spectrum band, wherein the non-coherent modulation configuration is further selected based at least in part on the modulation and coding scheme exceeding a threshold.

Aspect 8: The method of any of aspects 1 through 7, further comprising: identifying, for a plurality of DPSK constellations, a spectral efficiency associated with a communication link between the transmitting device and the receiving device based at least in part on the non-coherent modulation configuration being selected; and selecting a differential amplitude phase shift keying (DAPSK) constellation based at least in part on the spectral efficiency associated with the plurality of DPSK constellations being below a threshold, wherein the set of data is modulated in accordance with the DAPSK constellation.

Aspect 9: The method of any of aspects 1 through 8, further comprising: disabling transmission of phase tracking reference signals based at least in part on the non-coherent modulation configuration being selected; and mapping a portion of the set of data to resources allocated for the phase tracking reference signals.

Aspect 10: The method of aspect 9, wherein a coding rate of the time-domain waveform is reduced based at least in part on the mapping.

Aspect 11: The method of any of aspects 1 through 10, further comprising: selecting, from a group of channel access modes, a single-carrier frequency-domain multiple access (SC-FDMA) mode based at least in part on the radio frequency spectrum band, wherein the set of frequency-domain symbols are generated using the discrete Fourier transform based at least in part on the SC-FDMA mode being selected.

Aspect 12: The method of aspect 11, further comprising: identifying, for the SC-FDMA mode, a spectral efficiency associated with a communication link between the transmitting device and the receiving device; and selecting a multiple-input multiple-output (MIMO)SC-FDMA mode based at least in part on the spectral efficiency associated with the SC-FDMA mode being below a threshold, wherein the set of frequency-domain symbols are generated using the discrete Fourier transform based at least in part on the MIMO SC-FDMA mode.

Aspect 13: The method of any of aspects 11 through 12, further comprising: identifying an amount of resources allocated to the transmitting device and a carrier bandwidth configured for the transmitting device; and selecting a DPSK constellation based at least in part on a PAPR associated with communicating over the radio frequency spectrum band using the SC-FDMA mode and the DPSK constellation, wherein the PAPR associated with the DPSK constellation is based at least in part on a relationship between the amount of resources allocated to the transmitting device and the carrier bandwidth, and wherein the set of data is modulated in accordance with the DPSK constellation.

Aspect 14: The method of aspect 13, wherein selecting the DPSK constellation comprises: determining that an entry of a table that corresponds to the amount of resources and the carrier bandwidth comprises an indication of the DPSK constellation.

Aspect 15: The method of any of aspects 11 through 14, further comprising: identifying a peak-to-average power (PAPR) threshold for communicating over the radio frequency spectrum band; identifying a first PAPR associated with communicating over the radio frequency spectrum band using the SC-FDMA mode and a first DPSK constellation of a first order; and identifying a second PAPR associated with communicating over the radio frequency spectrum band using the SC-FDMA mode and a second DPSK constellation of a second order that is larger than the first order, wherein the set of data is modulated in accordance with the second DPSK constellation based at least in part on the second PAPR being below the PAPR threshold.

Aspect 16: The method of any of aspects 11 through 15, wherein the group of channel access modes comprises single-carrier channel access modes and multiple-carrier channel access modes.

Aspect 17: The method of any of aspects 1 through 16, further comprising: disabling transmission of demodulation reference signals based at least in part on a delay profile associated with communicating over the radio frequency spectrum band using a non-coherent single-carrier frequency-domain multiple access (SC-FDMA) mode; and mapping a portion of the set of data to resources allocated for the demodulation reference signals, wherein a coding rate of the time-domain waveform is reduced based at least in part on the mapping.

Aspect 18: The method of any of aspects 1 through 17, further comprising: selecting from the group of modulation configurations, a coherent modulation configuration based at least in part on the radio frequency spectrum band, a modulation and coding scheme, a phase noise, or a combination thereof; modulating, based at least in part on the coherent modulation configuration being selected, a second set of data using a phase shift keying (PSK) modulation configuration to obtain a second set of modulated symbols; and transmitting, in a second symbol period of the radio frequency spectrum band, a second time-domain waveform based at least in part on the second set of modulated symbols.

Aspect 19: The method of aspect 18, wherein the coherent modulation configuration is selected based at least in part on the second set of data being scheduled for transmission over a sub-millimeter wave spectrum band, the modulation and coding scheme for transmitting the second set of data over the radio frequency spectrum band being below a first threshold, the phase noise associated with transmitting the second set of data over the radio frequency spectrum band being below a second threshold, or a combination thereof.

Aspect 20: The method of any of aspects 18 through 19, further comprising: selecting from a group of channel access modes for communicating over the radio frequency spectrum band, a single-carrier frequency-domain multiple access (SC-FDMA) mode based at least in part on the radio frequency spectrum band, the modulation and coding scheme, the phase noise, or a combination thereof; and generating a second set of frequency-domain symbols from the second set of modulated symbols using the discrete Fourier transform based at least in part on the SC-FDMA mode, wherein the second time-domain waveform is obtained from the second set of frequency-domain symbols.

Aspect 21: The method of aspect 20, further comprising: identifying a peak-to-average power (PAPR) threshold for communicating over the radio frequency spectrum band using the SC-FDMA mode; and increasing an order for the PSK modulation based at least in part on the PAPR threshold, wherein a PAPR of the second time-domain waveform satisfies the PAPR threshold based at least in part on the order for the PSK modulation being increased.

Aspect 22: The method of any of aspects 20 through 21, further comprising: mapping the second set of frequency-domain symbols to a set of subcarriers in the radio frequency spectrum band; generating a third time-domain waveform from the mapped second set of frequency-domain symbols using an inverse discrete Fourier transform; and upsampling the third time-domain waveform to obtain the second time-domain waveform.

Aspect 23: The method of any of aspects 18 through 22, further comprising: mapping the second set of modulated symbols to a set of subcarriers in the radio frequency spectrum band; generating a third time-domain waveform from the mapped second set of modulated symbols using an inverse discrete Fourier transform; and upsampling the third time-domain waveform to obtain the second time-domain waveform.

Aspect 24: The method of any of aspects 1 through 23, wherein the group of modulation configurations comprises one or more coherent modulation configurations and one or more non-coherent modulation configurations.

Aspect 25: The method of any of aspects 1 through 24, wherein the DPSK modulation comprises a differential M-ary phase shift keying modulation or a differential amplitude M-ary phase shift keying (DAPSK) modulation.

Aspect 26: A method for wireless communication at a receiving device, comprising: selecting, from a group of modulation configurations, a non-coherent modulation configuration based at least in part on a radio frequency spectrum band used by the receiving device to communicate with a transmitting device; receiving, in a symbol period of the radio frequency spectrum band, a time-domain waveform; generating a set of frequency-domain symbols from the time-domain waveform using a discrete Fourier transform; demapping the set of frequency-domain symbols from a set of subcarriers in the radio frequency spectrum band; generating a set of modulated symbols from the demapped set of frequency-domain symbols using an inverse discrete Fourier transform; and demodulating, based at least in part on the non-coherent modulation configuration, the set of modulated symbols using a differential phase shift keying (DPSK) demodulation to obtain a set of data.

Aspect 27: The method of aspect 26, further comprising: receiving, from the receiving device, an indication that a non-coherent single-carrier frequency-domain multiple access (SC-FDMA) mode has been selected for transmitting the set of data.

Aspect 28: The method of aspect 27, wherein the indication is received in a control channel using a coherent multiple-carrier orthogonal frequency-domain multiple access (OFDMA) mode.

Aspect 29: The method of any of aspects 26 through 28, further comprising: transmitting, to the transmitting device, a request for the non-coherent modulation configuration to be configured based at least in part on selecting the non-coherent modulation configuration.

Aspect 30: The method of any of aspects 26 through 29, further comprising: identifying a phase noise associated with transmitting the set of data over the radio frequency spectrum band, wherein the non-coherent modulation configuration is selected based at least in part on the phase noise exceeding a threshold.

Aspect 31: The method of any of aspects 26 through 30, further comprising: identifying that the radio frequency spectrum band comprises a millimeter wave spectrum band, a sub-Terahertz frequency spectrum band, or both, wherein the non-coherent modulation configuration is selected based at least in part on the set of data being scheduled for transmission over the millimeter wave spectrum band or the sub-Terahertz frequency spectrum band.

Aspect 32: The method of aspect 31, further comprising: identifying a modulation and coding scheme for transmitting the set of data over the radio frequency spectrum band, wherein the non-coherent modulation configuration is further selected based at least in part on the modulation and coding scheme exceeding a threshold.

Aspect 33: The method of any of aspects 26 through 32, further comprising: identifying, for a plurality of DPSK constellations, a spectral efficiency associated with a communication link between the receiving device and the transmitting device based at least in part on the non-coherent modulation configuration being selected; and selecting a differential amplitude phase shift keying (DAPSK) constellation based at least in part on the spectral efficiency associated with the plurality of DPSK constellations being below a threshold, wherein the set of data is demodulated in accordance with the DAPSK constellation.

Aspect 34: The method of any of aspects 26 through 33, further comprising: determining that transmission of phase tracking reference signals is disabled based at least in part on the non-coherent modulation configuration being selected; and receiving a portion of the set of data over resources allocated for the phase tracking reference signals.

Aspect 35: The method of any of aspects 26 through 34, further comprising: selecting, from a group of channel access modes, a single-carrier frequency-domain multiple access (SC-FDMA) mode based at least in part on the radio frequency spectrum band, wherein the set of frequency-domain symbols are generated using the discrete Fourier transform based at least in part on the SC-FDMA mode being selected.

Aspect 36: The method of aspect 35, further comprising: identifying, for the SC-FDMA mode, a spectral efficiency associated with a communication link between the transmitting device and the receiving device; and selecting a multiple-input multiple-output (MIMO)SC-FDMA mode based at least in part on the spectral efficiency associated with the SC-FDMA mode being below a threshold, wherein the set of frequency-domain symbols are generated using the discrete Fourier transform based at least in part on the MIMO SC-FDMA mode.

Aspect 37: The method of any of aspects 35 through 36, further comprising: identifying an amount of resources allocated to the receiving device and a carrier bandwidth configured for the receiving device; and selecting a DPSK constellation based at least in part on a PAPR associated with communicating over the radio frequency spectrum band using the SC-FDMA mode and the DPSK constellation, wherein the PAPR associated with the DPSK constellation is based at least in part on a relationship between the amount of resources allocated to the transmitting device and the carrier bandwidth, and wherein the set of data is demodulated in accordance with the DPSK constellation.

Aspect 38: The method of aspect 37, wherein selecting the DPSK constellation comprises: determining that an entry of a table that corresponds to the amount of resources and the carrier bandwidth comprises an indication of the DPSK constellation.

Aspect 39: The method of any of aspects 35 through 38, wherein the group of channel access modes comprises single-carrier channel access modes and multiple-carrier channel access modes.

Aspect 40: The method of any of aspects 26 through 39, further comprising: identifying a peak-to-average power (PAPR) threshold for communicating over the radio frequency spectrum band; identifying a first PAPR associated with communicating over the radio frequency spectrum band using the SC-FDMA mode and a first DPSK constellation of a first order; and identifying a second PAPR associated with communicating over the radio frequency spectrum band using the SC-FDMA mode and a second DPSK constellation of a second order that is larger than the first order, wherein the set of data is modulated in accordance with the second DPSK constellation based at least in part on the second PAPR being below the PAPR threshold.

Aspect 41: The method of any of aspects 26 through 40, further comprising: transmitting, to the transmitting device, a request to disable transmission of demodulation reference signals based at least in part on a delay profile associated with communicating over the radio frequency spectrum band using a non-coherent single-carrier frequency-domain multiple access (SC-FDMA) mode; and receiving a portion of the set of data over resources allocated for the demodulation reference signals.

Aspect 42: An apparatus for wireless communication at a transmitting device, comprising a processor; memory coupled with the processor; and instructions stored in the memory and executable by the processor to cause the apparatus to perform a method of any of aspects 1 through 25.

Aspect 43: An apparatus for wireless communication at a transmitting device, comprising at least one means for performing a method of any of aspects 1 through 25.

Aspect 44: A non-transitory computer-readable medium storing code for wireless communication at a transmitting device, the code comprising instructions executable by a processor to perform a method of any of aspects 1 through 25.

Aspect 45: An apparatus for wireless communication at a receiving device, comprising a processor; memory coupled with the processor; and instructions stored in the memory and executable by the processor to cause the apparatus to perform a method of any of aspects 26 through 41.

Aspect 46: An apparatus for wireless communication at a receiving device, comprising at least one means for performing a method of any of aspects 26 through 41.

Aspect 47: A non-transitory computer-readable medium storing code for wireless communication at a receiving device, the code comprising instructions executable by a processor to perform a method of any of aspects 26 through 41.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a transmitting device, comprising:
    selecting, from a group of modulation configurations, a non-coherent modulation configuration based at least in part on a radio frequency spectrum band used by the transmitting device to communicate with a receiving device;
    modulating, based at least in part on the non-coherent modulation configuration, a set of data using a differential phase shift keying (DPSK) modulation to obtain a set of modulated symbols;
    generating a set of frequency-domain symbols from the set of modulated symbols using a discrete Fourier transform;
    transmitting, to the receiving device, an indication that a non-coherent single-carrier frequency-domain multiple access (SC-FDMA) mode has been selected for transmitting the set of data; and
    transmitting, in a symbol period of the radio frequency spectrum band, a time-domain waveform obtained from the set of frequency-domain symbols.

2. The method of claim 1, wherein the indication is transmitted in a control channel using a coherent multiple-carrier orthogonal frequency-domain multiple access (OFDMA) mode.

3. The method of claim 1, further comprising:
    receiving, from the receiving device, a request for the non-coherent modulation configuration to be configured, wherein the non-coherent modulation configuration is selected based at least in part on the request.

4. The method of claim 1, further comprising:
    identifying a phase noise associated with transmitting the set of data over the radio frequency spectrum band, wherein the non-coherent modulation configuration is selected based at least in part on the phase noise exceeding a threshold.

5. The method of claim 1, further comprising:
    identifying that the radio frequency spectrum band comprises a millimeter wave spectrum band, a sub-Terahertz frequency spectrum band, or both, wherein the non-coherent modulation configuration is selected based at least in part on the set of data being scheduled for transmission over the millimeter wave spectrum band or the sub-Terahertz frequency spectrum band.

6. The method of claim 5, further comprising:
    identifying a modulation and coding scheme for transmitting the set of data over the radio frequency spectrum band, wherein the non-coherent modulation configuration is further selected based at least in part on the modulation and coding scheme exceeding a threshold.

7. The method of claim 1, further comprising:
identifying, for a plurality of DPSK constellations, a spectral efficiency associated with a communication link between the transmitting device and the receiving device based at least in part on the non-coherent modulation configuration being selected; and
selecting a differential amplitude phase shift keying (DAPSK) constellation based at least in part on the spectral efficiency associated with the plurality of DPSK constellations being below a threshold, wherein the set of data is modulated in accordance with the DAPSK constellation.

8. The method of claim 1, further comprising:
disabling transmission of phase tracking reference signals based at least in part on the non-coherent modulation configuration being selected; and
mapping a portion of the set of data to resources allocated for the phase tracking reference signals, wherein a coding rate of the time-domain waveform is reduced based at least in part on the mapping.

9. The method of claim 1, further comprising:
selecting, from a group of channel access modes, the SC-FDMA mode based at least in part on the radio frequency spectrum band, wherein the set of frequency-domain symbols are generated using the discrete Fourier transform based at least in part on the SC-FDMA mode being selected.

10. The method of claim 9, further comprising:
identifying, for the SC-FDMA mode, a spectral efficiency associated with a communication link between the transmitting device and the receiving device; and
selecting a multiple-input multiple-output (MIMO) SC-FDMA mode based at least in part on the spectral efficiency associated with the SC-FDMA mode being below a threshold, wherein the set of frequency-domain symbols are generated using the discrete Fourier transform based at least in part on the MIMO SC-FDMA mode.

11. The method of claim 9, further comprising:
identifying an amount of resources allocated to the transmitting device and a carrier bandwidth configured for the transmitting device; and
selecting a DPSK constellation based at least in part on a PAPR associated with communicating over the radio frequency spectrum band using the SC-FDMA mode and the DPSK constellation, wherein the PAPR associated with the DPSK constellation is based at least in part on a relationship between the amount of resources allocated to the transmitting device and the carrier bandwidth, and wherein the set of data is modulated in accordance with the DPSK constellation.

12. The method of claim 9, further comprising:
identifying a peak-to-average power (PAPR) threshold for communicating over the radio frequency spectrum band;
identifying a first PAPR associated with communicating over the radio frequency spectrum band using the SC-FDMA mode and a first DPSK constellation of a first order; and
identifying a second PAPR associated with communicating over the radio frequency spectrum band using the SC-FDMA mode and a second DPSK constellation of a second order that is larger than the first order, wherein the set of data is modulated in accordance with the second DPSK constellation based at least in part on the second PAPR being below the PAPR threshold.

13. The method of claim 1, further comprising:
disabling transmission of demodulation reference signals based at least in part on a delay profile associated with communicating over the radio frequency spectrum band using the non-coherent SC-FDMA mode;
mapping a portion of the set of data to resources allocated for the demodulation reference signals, wherein a coding rate of the time-domain waveform is reduced based at least in part on the mapping.

14. The method of claim 1, further comprising:
selecting from the group of modulation configurations, a coherent modulation configuration based at least in part on the radio frequency spectrum band, a modulation and coding scheme, a phase noise, or a combination thereof;
modulating, based at least in part on the coherent modulation configuration being selected, a second set of data using a phase shift keying (PSK) modulation configuration to obtain a second set of modulated symbols; and
transmitting, in a second symbol period of the radio frequency spectrum band, a second time-domain waveform based at least in part on the second set of modulated symbols.

15. The method of claim 14, wherein the coherent modulation configuration is selected based at least in part on:
the second set of data being scheduled for transmission over a sub-millimeter wave spectrum band,
the modulation and coding scheme for transmitting the second set of data over the radio frequency spectrum band being below a first threshold,
the phase noise associated with transmitting the second set of data over the radio frequency spectrum band being below a second threshold, or
a combination thereof.

16. The method of claim 14, further comprising:
selecting from a group of channel access modes for communicating over the radio frequency spectrum band, the SC-FDMA mode based at least in part on the radio frequency spectrum band, the modulation and coding scheme, the phase noise, or a combination thereof;
generating a second set of frequency-domain symbols from the second set of modulated symbols using the discrete Fourier transform based at least in part on the SC-FDMA mode, wherein the second time-domain waveform is obtained from the second set of frequency-domain symbols;
identifying a peak-to-average power (PAPR) threshold for communicating over the radio frequency spectrum band using the SC-FDMA mode; and
increasing an order for the PSK modulation based at least in part on the PAPR threshold, wherein a PAPR of the second time-domain waveform satisfies the PAPR threshold based at least in part on the order for the PSK modulation being increased.

17. The method of claim 14, further comprising:
mapping the second set of modulated symbols to a set of subcarriers in the radio frequency spectrum band;
generating a third time-domain waveform from the mapped second set of modulated symbols using an inverse discrete Fourier transform; and
upsampling the third time-domain waveform to obtain the second time-domain waveform.

18. A method for wireless communication at a receiving device, comprising:

selecting, from a group of modulation configurations, a non-coherent modulation configuration based at least in part on a radio frequency spectrum band used by the receiving device to communicate with a transmitting device;

receiving, from the transmitting device, an indication that a non-coherent single-carrier frequency-domain multiple access (SC-FDMA) mode has been selected for transmitting a set of data;

receiving, in a symbol period of the radio frequency spectrum band, a time-domain waveform;

generating a set of frequency-domain symbols from the time-domain waveform using a discrete Fourier transform;

demapping the set of frequency-domain symbols from a set of subcarriers in the radio frequency spectrum band;

generating a set of modulated symbols from the demapped set of frequency-domain symbols using an inverse discrete Fourier transform; and demodulating, based at least in part on the non-coherent modulation configuration, the set of modulated symbols using a differential phase shift keying (DPSK) demodulation to obtain the set of data.

19. The method of claim 18, further comprising:
transmitting, to the transmitting device, a request for the non-coherent modulation configuration to be configured based at least in part on selecting the non-coherent modulation configuration.

20. The method of claim 18, further comprising:
identifying a phase noise associated with transmitting the set of data over the radio frequency spectrum band, wherein the non-coherent modulation configuration is selected based at least in part on the phase noise exceeding a threshold.

21. The method of claim 18, further comprising:
identifying, for a plurality of DPSK constellations, a spectral efficiency associated with a communication link between the receiving device and the transmitting device based at least in part on the non-coherent modulation configuration being selected; and selecting a differential amplitude phase shift keying (DAPSK) constellation based at least in part on the spectral efficiency associated with the plurality of DPSK constellations being below a threshold, wherein the set of data is demodulated in accordance with the DAPSK constellation.

22. The method of claim 18, further comprising:
transmitting, to the transmitting device, a request to disable transmission of demodulation reference signals based at least in part on a delay profile associated with communicating over the radio frequency spectrum band using the non-coherent SC-FDMA mode; and receiving a portion of the set of data over resources allocated for the demodulation reference signals.

23. An apparatus for wireless communication at a transmitting device, comprising:
a processor,
memory coupled with the processor; and
instructions stored in the memory and executable by the processor to cause the apparatus to:
select, from a group of modulation configurations, a non-coherent modulation configuration based at least in part on a radio frequency spectrum band used by the transmitting device to communicate with a receiving device;

modulate, based at least in part on the non-coherent modulation configuration, a set of data using a differential phase shift keying (DPSK) modulation to obtain a set of modulated symbols;

generate a set of frequency-domain symbols from the set of modulated symbols using a discrete Fourier transform;

transmit, to the receiving device, an indication that a non-coherent single-carrier frequency-domain multiple access (SC-FDMA) mode has been selected for transmitting the set of data; and transmit, in a symbol period of the radio frequency spectrum band, a time-domain waveform obtained from the set of frequency-domain symbols.

24. The apparatus of claim 23, wherein the instructions are further executable by the processor to cause the apparatus to:
receive, from the receiving device, a request for the non-coherent modulation configuration to be configured, wherein the non-coherent modulation configuration is selected based at least in part on the request.

25. The apparatus of claim 23, wherein the instructions are further executable by the processor to:
identify a phase noise associated with transmitting the set of data over the radio frequency spectrum band, wherein the non-coherent modulation configuration is selected based at least in part on the phase noise exceeding a threshold.

26. An apparatus for wireless communication at a receiving device, comprising:
a processor,
memory coupled with the processor; and
instructions stored in the memory and executable by the processor to cause the apparatus to:
select, from a group of modulation configurations, a non-coherent modulation configuration based at least in part on a radio frequency spectrum band used by the receiving device to communicate with a transmitting device;

receive, from the transmitting device, an indication that a non-coherent single-carrier frequency-domain multiple access (SC-FDMA) mode has been selected for transmitting a set of data;

receive, in a symbol period of the radio frequency spectrum band, a time-domain waveform;

generate a set of frequency-domain symbols from the time-domain waveform using a discrete Fourier transform;

demap the set of frequency-domain symbols from a set of subcarriers in the radio frequency spectrum band;

generate a set of modulated symbols from the demapped set of frequency-domain symbols using an inverse discrete Fourier transform; and demodulate, based at least in part on the non-coherent modulation configuration, the set of modulated symbols using a differential phase shift keying (DPSK) demodulation to obtain the set of data.

* * * * *